(12) United States Patent
Enders

(10) Patent No.: US 8,360,464 B2
(45) Date of Patent: Jan. 29, 2013

(54) COVERS FOR INFLATABLE KNEE AIRBAG HOUSINGS

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 41 days.

(21) Appl. No.: 12/872,323

(22) Filed: Aug. 31, 2010

(65) Prior Publication Data

US 2012/0049488 A1  Mar. 1, 2012

(51) Int. Cl.
*B60R 21/206* (2011.01)
(52) U.S. Cl. .................................. 280/730.1; 280/728.2
(58) Field of Classification Search ............... 280/728.2, 280/728.3, 730.1
See application file for complete search history.

(56) References Cited

U.S. PATENT DOCUMENTS

| | | | |
|---|---|---|---|
| 3,858,822 A | 1/1975 | Wood | |
| 3,904,222 A * | 9/1975 | Bursott et al. | 280/732 |
| 3,966,227 A * | 6/1976 | Cameron | 280/752 |
| 4,290,627 A | 9/1981 | Cumming et al. | |
| 5,338,061 A | 8/1994 | Nelson et al. | |
| 5,344,184 A | 9/1994 | Keeler et al. | |
| 5,427,410 A | 6/1995 | Shiota et al. | |
| 5,460,400 A | 10/1995 | Davidson | |
| 5,529,337 A | 6/1996 | Takeda et al. | |
| 5,669,627 A | 9/1997 | Marjanski et al. | |
| 5,690,354 A | 11/1997 | Logan et al. | |
| 5,765,867 A | 6/1998 | French | |
| 5,772,239 A | 6/1998 | Seymour | |
| 5,803,487 A * | 9/1998 | Kikuchi et al. | 280/728.2 |
| 5,810,390 A | 9/1998 | Enders et al. | |
| 5,823,566 A | 10/1998 | Manire | |
| 5,845,935 A | 12/1998 | Enders et al. | |
| 5,927,748 A | 7/1999 | O'Driscoll | |
| 6,010,147 A | 1/2000 | Brown | |
| 6,059,312 A | 5/2000 | Staub et al. | |
| 6,135,495 A | 10/2000 | Redgrave et al. | |
| 6,155,595 A | 12/2000 | Schultz | |
| 6,213,496 B1 | 4/2001 | Minami et al. | |
| 6,217,059 B1 | 4/2001 | Brown et al. | |

(Continued)

FOREIGN PATENT DOCUMENTS

| | | |
|---|---|---|
| DE | 20 2006 014 012 | 8/2006 |
| DE | 10 2008 029810 | 12/2009 |

(Continued)

OTHER PUBLICATIONS

Notice of Allowance and Fee(s) Due mailed Oct. 18, 2011 in co-pending U.S. Appl. No. 12/430,274, now published as U.S. Publication No. US 2010/0270779.

(Continued)

*Primary Examiner* — Faye M Fleming
*Assistant Examiner* — James English
(74) *Attorney, Agent, or Firm* — Sally J. Brown; Stoel Rives, LLP

(57) ABSTRACT

An inflatable knee airbag is typically stored in a packaged state within an airbag housing. The housing typically has a cover, which can be either a cosmetic cover or an unfinished cover, if the cover will not be readily visible to an occupant. The cover can be extruded rather than molded and may have features for coupling the cover to the housing. The cover may also have other features such as a tear seam.

23 Claims, 20 Drawing Sheets

U.S. PATENT DOCUMENTS

| | | | |
|---|---|---|---|
| 6,224,129 B1 | 5/2001 | Cisternino et al. |
| 6,254,121 B1 | 7/2001 | Fowler et al. |
| 6,299,205 B1 | 10/2001 | Keshavaraj |
| 6,364,348 B1 | 4/2002 | Jang et al. |
| 6,431,583 B1 | 8/2002 | Schneider |
| 6,454,296 B1 | 9/2002 | Tesch et al. |
| 6,464,255 B1 | 10/2002 | Preisler et al. |
| 6,474,686 B1 | 11/2002 | Higuchi et al. |
| 6,494,484 B2 | 12/2002 | Bosgieter et al. |
| 6,588,793 B2 | 7/2003 | Rose |
| 6,631,920 B1* | 10/2003 | Webber et al. ............ 280/730.1 |
| 6,655,711 B1 | 12/2003 | Labrie et al. |
| 6,682,093 B2 | 1/2004 | Tajima et al. |
| 6,685,217 B2 | 2/2004 | Abe |
| 6,715,789 B2 | 4/2004 | Takimoto et al. |
| 6,752,417 B2 | 6/2004 | Takimoto et al. |
| 6,846,005 B2 | 1/2005 | Ford et al. |
| 6,913,280 B2 | 7/2005 | Dominissini et al. |
| 6,945,557 B2 | 9/2005 | Takimoto et al. |
| 6,959,944 B2 | 11/2005 | Mori et al. |
| 6,962,363 B2 | 11/2005 | Wang et al. |
| 6,962,366 B2 | 11/2005 | Fukuda et al. |
| 7,000,945 B2 | 2/2006 | Bakhsh et al. |
| 7,000,947 B2 | 2/2006 | Kumagai et al. |
| 7,029,026 B2 | 4/2006 | Morita |
| 7,055,851 B2 | 6/2006 | Takimoto et al. |
| 7,131,664 B1 | 11/2006 | Pang et al. |
| 7,147,247 B2 | 12/2006 | Hayakawa |
| 7,156,418 B2 | 1/2007 | Sato et al. |
| 7,175,195 B2 | 2/2007 | Morita |
| 7,182,365 B2 | 2/2007 | Takimoto et al. |
| 7,185,912 B2 | 3/2007 | Matsuura et al. |
| 7,195,275 B2 | 3/2007 | Abe |
| 7,195,280 B2 | 3/2007 | Wheelwright et al. |
| 7,201,396 B2 | 4/2007 | Takimoto et al. |
| 7,226,077 B2 | 6/2007 | Abe |
| 7,232,149 B2 | 6/2007 | Hotta et al. |
| 7,261,318 B2 | 8/2007 | Enders |
| 7,281,734 B2 | 10/2007 | Abe et al. |
| 7,314,228 B2 | 1/2008 | Ishiguro et al. |
| 7,314,230 B2 | 1/2008 | Kumagai et al. |
| 7,347,444 B2 | 3/2008 | Wheelwright |
| 7,370,881 B2 | 5/2008 | Takimoto et al. |
| 7,374,201 B2 | 5/2008 | Chausset |
| 7,374,202 B2 | 5/2008 | Lim |
| 7,380,813 B2 | 6/2008 | Lanzinger et al. |
| 7,384,065 B2 | 6/2008 | Takimoto et al. |
| 7,387,311 B2 | 6/2008 | Kanno et al. |
| 7,396,044 B2 | 7/2008 | Bauer et al. |
| 7,434,837 B2 | 10/2008 | Hotta et al. |
| 7,438,310 B2* | 10/2008 | Takimoto et al. ........ 280/730.1 |
| 7,549,672 B2 | 6/2009 | Sato et al. |
| 7,566,074 B2 | 7/2009 | Hawthorn et al. |
| 7,568,724 B2 | 8/2009 | Kutchey et al. |
| 7,568,730 B2 | 8/2009 | Kwon |
| 7,631,894 B2 | 12/2009 | Hasebe et al. |
| 7,641,223 B2* | 1/2010 | Knowlden ................. 280/728.3 |
| 7,658,408 B2 | 2/2010 | Zofchak et al. |
| 7,658,409 B2 | 2/2010 | Ford et al. |
| 7,695,013 B2 | 4/2010 | Kakstis et al. |
| 7,712,769 B2 | 5/2010 | Hasebe et al. |
| 7,717,460 B2 | 5/2010 | Franke et al. |
| 7,744,118 B2 | 6/2010 | Takimoto et al. |
| 7,748,739 B2 | 7/2010 | Brinker |
| 7,753,405 B2 | 7/2010 | Ishiguro et al. |
| 7,753,407 B2 | 7/2010 | Yokota |
| 7,766,374 B2 | 8/2010 | Abele et al. |
| 7,793,973 B2 | 9/2010 | Sato et al. |
| 7,798,517 B2* | 9/2010 | Ishida ....................... 280/728.2 |
| 7,819,419 B2 | 10/2010 | Hayashi et al. |
| 7,878,540 B2 | 2/2011 | Takimoto et al. |
| 8,083,254 B2 | 12/2011 | Enders et al. |
| 8,118,325 B2 | 2/2012 | Enders et al. |
| 8,272,667 B2 | 9/2012 | Schneider et al. |
| 2001/0007391 A1 | 7/2001 | Hamada et al. |
| 2002/0044819 A1 | 4/2002 | Shamoon |
| 2002/0149187 A1 | 10/2002 | Holtz et al. |
| 2002/0171231 A1 | 11/2002 | Takimoto et al. |
| 2002/0180187 A1 | 12/2002 | Hayashi |
| 2003/0034637 A1 | 2/2003 | Wang et al. |
| 2003/0209888 A1 | 11/2003 | Davis, Jr. et al. |
| 2005/0001412 A1 | 1/2005 | Schneider et al. |
| 2005/0057028 A1 | 3/2005 | Hayakawa |
| 2005/0062265 A1 | 3/2005 | Hotta et al. |
| 2005/0151351 A1 | 7/2005 | Enders et al. |
| 2005/0194767 A1 | 9/2005 | Freisler et al. |
| 2005/0194771 A1 | 9/2005 | Clark et al. |
| 2005/0212275 A1 | 9/2005 | Hasebe |
| 2005/0230939 A1 | 10/2005 | Abe et al. |
| 2006/0279073 A1 | 12/2006 | Hotta et al. |
| 2007/0057487 A1 | 3/2007 | Kim |
| 2007/0120346 A1 | 5/2007 | Kwon |
| 2007/0200321 A1 | 8/2007 | Heitplatz et al. |
| 2007/0246920 A1 | 10/2007 | Abele et al. |
| 2007/0267852 A1 | 11/2007 | Enders |
| 2008/0048418 A1 | 2/2008 | Remley et al. |
| 2008/0157509 A1 | 7/2008 | Abe et al. |
| 2008/0217892 A1 | 9/2008 | Maripudi et al. |
| 2008/0238048 A1 | 10/2008 | Ishida |
| 2009/0045607 A1 | 2/2009 | Fukuyama et al. |
| 2009/0058048 A1 | 3/2009 | Shida et al. |
| 2009/0058052 A1 | 3/2009 | Ford et al. |
| 2009/0085333 A1 | 4/2009 | Imaeda et al. |
| 2009/0134611 A1 | 5/2009 | Wigger et al. |
| 2009/0146400 A1 | 6/2009 | Knowlden |
| 2009/0152842 A1 | 6/2009 | Benny et al. |
| 2009/0152847 A1 | 6/2009 | Hong et al. |
| 2009/0184498 A1 | 7/2009 | Takimoto et al. |
| 2009/0212541 A1 | 8/2009 | Wallat et al. |
| 2009/0242308 A1 | 10/2009 | Kitte et al. |
| 2010/0025973 A1 | 2/2010 | Jang et al. |
| 2010/0090445 A1 | 4/2010 | Williams et al. |
| 2010/0270775 A1 | 10/2010 | Enders et al. |
| 2010/0270779 A1 | 10/2010 | Enders et al. |
| 2010/0270782 A1 | 10/2010 | Enders et al. |
| 2011/0012327 A1 | 1/2011 | Enders |
| 2011/0101660 A1 | 5/2011 | Schneider et al. |
| 2011/0148077 A1 | 6/2011 | Enders |
| 2012/0025496 A1 | 2/2012 | Schneider et al. |
| 2012/0049497 A1 | 3/2012 | Enders |

FOREIGN PATENT DOCUMENTS

| | | |
|---|---|---|
| WO | WO 02/04262 | 1/2002 |
| WO | WO 2010/126623 | 11/2010 |
| WO | WO-2011/008916 | 1/2011 |
| WO | WO-2011/056810 | 5/2011 |
| WO | WO-2011/079178 | 6/2011 |
| WO | WO-2012/030482 | 3/2012 |

OTHER PUBLICATIONS

Amendment and Response After Final filed Aug. 29, 2011 in co-pending U.S. Appl. No. 12/504,544, now published as U.S. Publication No. US 2011/0012327.

Advisory Action mailed Sep. 9, 2011 in co-pending U.S. Appl. No. 12/504,544, now published as U.S. Publication No. US 2011/0012327.

Request for Continued Examination filed Oct. 6, 2011 in co-pending U.S. Appl. No. 12/504,544, now published as U.S. Publication No. US 2011/0012327.

Office Action mailed Dec. 1, 2011 in co-pending U.S. Appl. No. 12/504,544, now published as U.S. Publication No. US 2011/0012327.

Restriction Requirement mailed Dec. 14, 2011 in co-pending U.S. Appl. No. 12/611,676, now published as U.S. Publication No. US 2011/0101660.

Restriction Requirement mailed Oct. 27, 2011 in co-pending U.S. Appl. No. 12/872,946.

Amendment and Response to Requirement of Election of Species filed Nov. 28, 2011 in co-pending U.S. Appl. No. 12/872,946.

Office Action mailed Dec. 14, 2011 in co-pending U.S. Appl. No. 12/872,946.

Co-pending U.S. Appl. No. 13/270,462, titled Knee Airbag Assemblies and Related Methods, filed Oct. 11, 2011.

Co-pending U.S. Appl. No. 13/290,856, titled Knee Airbag Folding Patterns and Assemblies and Related Methods, filed Nov. 7, 2011.
Amendment and Response to Office Action filed Jun. 30, 2011 in co-pending U.S. Appl. No. 12/430,562, now published as U.S. Publication No. US 2010/0270775.
Examiner's Interview Summary mailed Jul. 6, 2011 in co-pending U.S. Appl. No. 12/430,562, now published as U.S. Publication No. US 2010/0270775.
Notice of Allowance and Fee(s) Due mailed Aug. 23, 2011 in co-pending U.S. Appl. No. 12/430,562, now published as U.S. Publication No. US 2010/0270775.
Amendment and Response to Office Action filed Jul. 21, 2011 in co-pending U.S. Appl. No. 12/430,274, now published as U.S. Publication No. US 2010/0270779.
Amendment and Response to Office Action filed Apr. 28, 2011 in co-pending U.S. Appl. No. 12/430,246, now published as U.S. Publication No. US 2010/0270782.
Final Office Action mailed Jun. 24, 2011 in co-pending U.S. Appl. No. 12/430,246, now published as U.S. Publication No. US 2010/0270782.
Amendment and Response to Office Action filed Jun. 13, 2011 in co-pending U.S. Appl. No. 12/504,544, now published as U.S. Publication No. US 2011/0012327.
Final Office Action mailed Jun. 29, 2011 in co-pending U.S. Appl. No. 12/504,544, now published as U.S. Publication No. US 2011/0012327.
Examiner's Interview Summary mailed Jul. 7, 2011 in co-pending U.S. Appl. No. 12/504,544, now published as U.S. Publication No. US 2011/0012327.
Restriction Requirement mailed Sep. 15, 2010 in co-pending U.S. Appl. No. 12/430,246.
Amendment and Response to Requirement for Election of Species filed Oct. 12, 2010 in co-pending U.S. Appl. No. 12/430,246.
Preliminary Amendment filed Aug. 31, 2009 in co-pending U.S. Appl. No. 12/504,544.
Preliminary Amendment filed Jul. 15, 2010 in co-pending U.S. Appl. No. 12/504,544.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Sep. 23, 2010 in International Application No. PCT/US2010/042070.
Co-pending U.S. Appl. No. 12/430,562, titled Knee Airbag Assemblies Configured for Inflator Insertion and Inflator-Mediated Coupling to an Airbag Housing, filed Apr. 27, 2009.
Co-pending U.S. Appl. No. 12/430,274, titled Inflatable Knee Airbags and Internal Tethers Produced From Single Panels of Material, filed Apr. 27, 2009.
Co-pending U.S. Appl. No. 12/430,246, titled Inflatable Knee Airbags Assemblies With Bag Straps for Wrapping the Airbags and Optimizing Deployment, filed Apr. 27, 2009.
Co-pending U.S. Appl. No. 12/645,130, titled Inflatable Airbag Assembly With an Integral Cover, filed Dec. 22, 2009.
Co-pending U.S. Appl. No. 12/504,544, titled Inflatable Knee Airbag Having Two Chambers Separated by an Internal Tether, filed Jul. 16, 2009.
Co-pending U.S. Appl. No. 12/611,676, titled Low-Mount Inflatable Knee Airbags Having Serial Chambers, filed Nov. 3, 2009.
Co-pending U.S. Appl. No. 12/872,946, titled Inflatable Knee Airbag Assemblies With Articulating Housings, filed Aug. 31, 2010.

Office Action mailed Oct. 29, 2010 in co-pending U.S. Appl. No. 12/430,246, now published as U.S. Publication No. US 2010/0270782.
Notification of Transmittal of the International Search Report and the Written Opinion of the International Searching Authority mailed Jan. 3, 2011 in International Application No. PCT/US2010/055197.
Restriction and/or Election Requirement mailed Jan. 20, 2011 in co-pending U.S. Appl. No. 12/430,562, now published as U.S. Publication No. US 2010/0270775.
Amendment and Response to Requirement of Election of Species filed Feb. 22, 2011 in co-pending U.S. Appl. No. 12/430,562, now published as U.S. Publication No. US 2010/0270775.
Office Action mailed Mar. 30, 2011 in co-pending U.S. Appl. No. 12/430,562, now published as U.S. Publication No. US 2010/0270775.
Office Action mailed Jan. 21, 2011 in co-pending U.S. Appl. No. 12/430,274, now published as U.S. Publication No. US 2010/0270779.
Office Action mailed Dec. 13, 2010 in co-pending U.S. Appl. No. 12/504,544, now published as U.S. Publication No. US 2011/0012327.
Notification of Transmittal of the International Search Report and the Written Opinion of the International Searching Authority mailed Feb. 18, 2011 in International Application No. PCT/US2010/061744.
Restriction Requirement mailed Jan. 20, 2012 in co-pending U.S. Appl. No. 12/645,130, now published as U.S. Publication No. US 2011/0148077.
Amendment and Response to Restriction Requirement filed Jan. 17, 2012 in co-pending U.S. Appl. No. 12/611,676, now published as U.S. Publication No. US 2011/0101660.
Notification of Transmittal of the International Search Report and the Written Opinion of the International Searching Authority mailed Jan. 26, 2012 in International Application No. PCT/US2011/046952.
Amendment and Response to Restriction Requirement filed Jun. 20, 2012 in co-pending U.S. Appl. No. 12/645,130, now published as U.S. Publication No. US 2011/0148077.
Office Action mailed Jul. 19, 2012 in co-pending U.S. Appl. No. 12/645,130, now published as U.S. Publication No. US 2011/0148077.
Amendment and Response to Office Action filed May 29, 2012 in co-pending U.S. Appl. No. 12/504,544, now published as U.S. Publication No. US 2011/0012327.
Notice of Allowance and Fee(s) Due mailed Jun. 28, 2012 in co-pending U.S. Appl. No. 12/504,544, now published as U.S. Publication No. US 2011/0012327.
Amendment and Response to Office Action filed Jun. 8, 2012 in co-pending U.S. Appl. No. 12/611,676, now published as U.S. Publication No. US 2011/0101660.
Notice of Allowance and Fee(s) Due mailed Jun. 19, 2012 in co-pending U.S. Appl. No. 12/611,676, now published as U.S. Publication No. US 2011/0101660.
Amendment and Response to Office Action filed Jun. 14, 2012 in co-pending U.S. Appl. No. 12/872,946, now published as U.S. Publication No. US 2012/0049497.
Notice of Allowance and Fee(s) Due mailed Jun. 28, 2012 in co-pending U.S. Appl. No. 12/872,946, now published as U.S. Publication No. US 2012/0049497.
Non-Final Office Action mailed Mar. 8, 2012 in co-pending U.S. Appl. No. 12/611,676, now published as U.S. Publication No. US 2011/0101660.

* cited by examiner

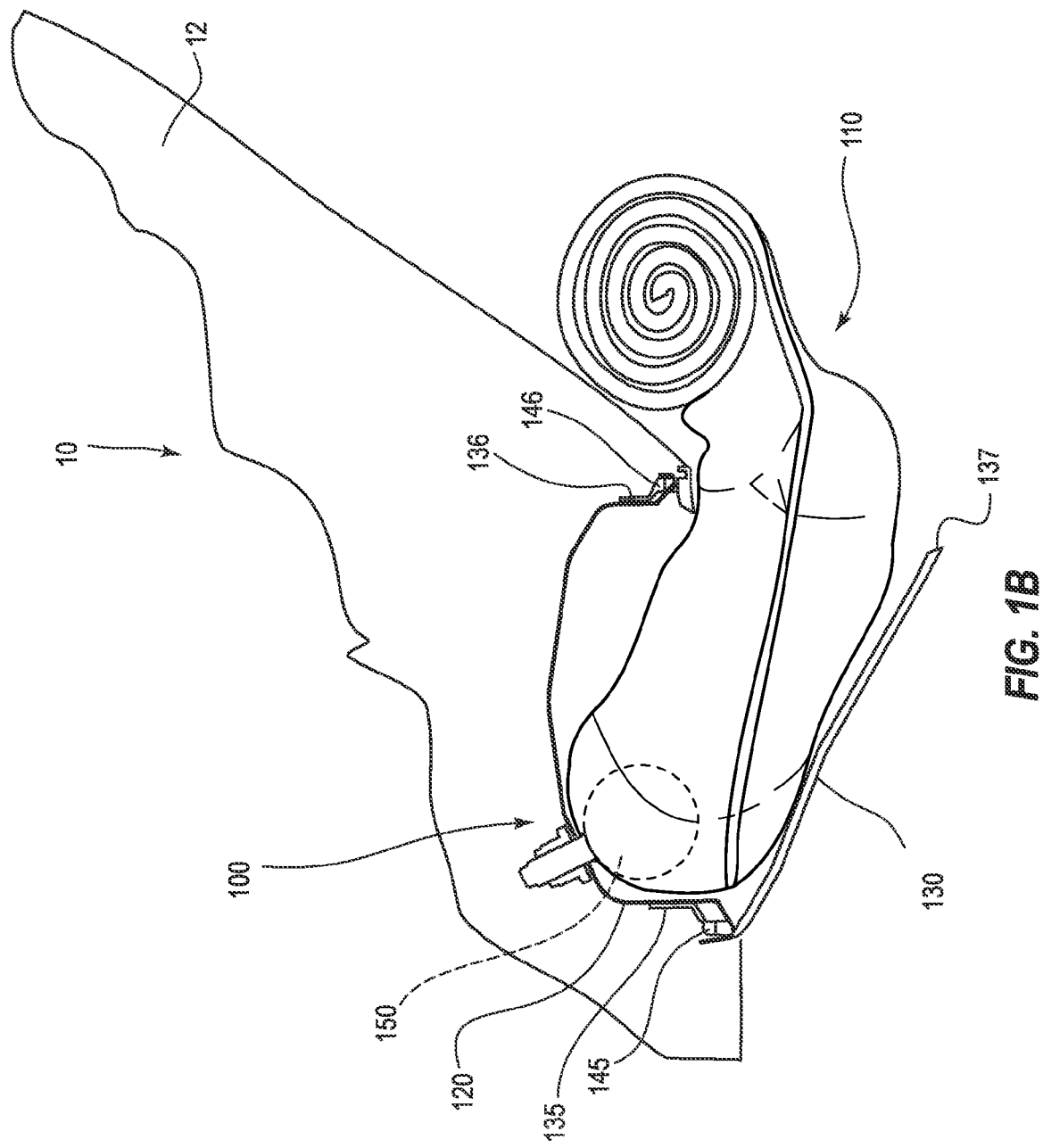

COVERS FOR INFLATABLE KNEE AIRBAG HOUSINGS

TECHNICAL FIELD

The present disclosure relates generally to the field of automotive protective systems. More specifically, the present disclosure relates to covers and housings for inflatable knee airbag cushion assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 1B is a side elevation view of the airbag assembly of FIG. 1A after the airbag has begun to be deployed.

DETAILED DESCRIPTION OF PREFERRED EMBODIMENTS

Figure 1A:
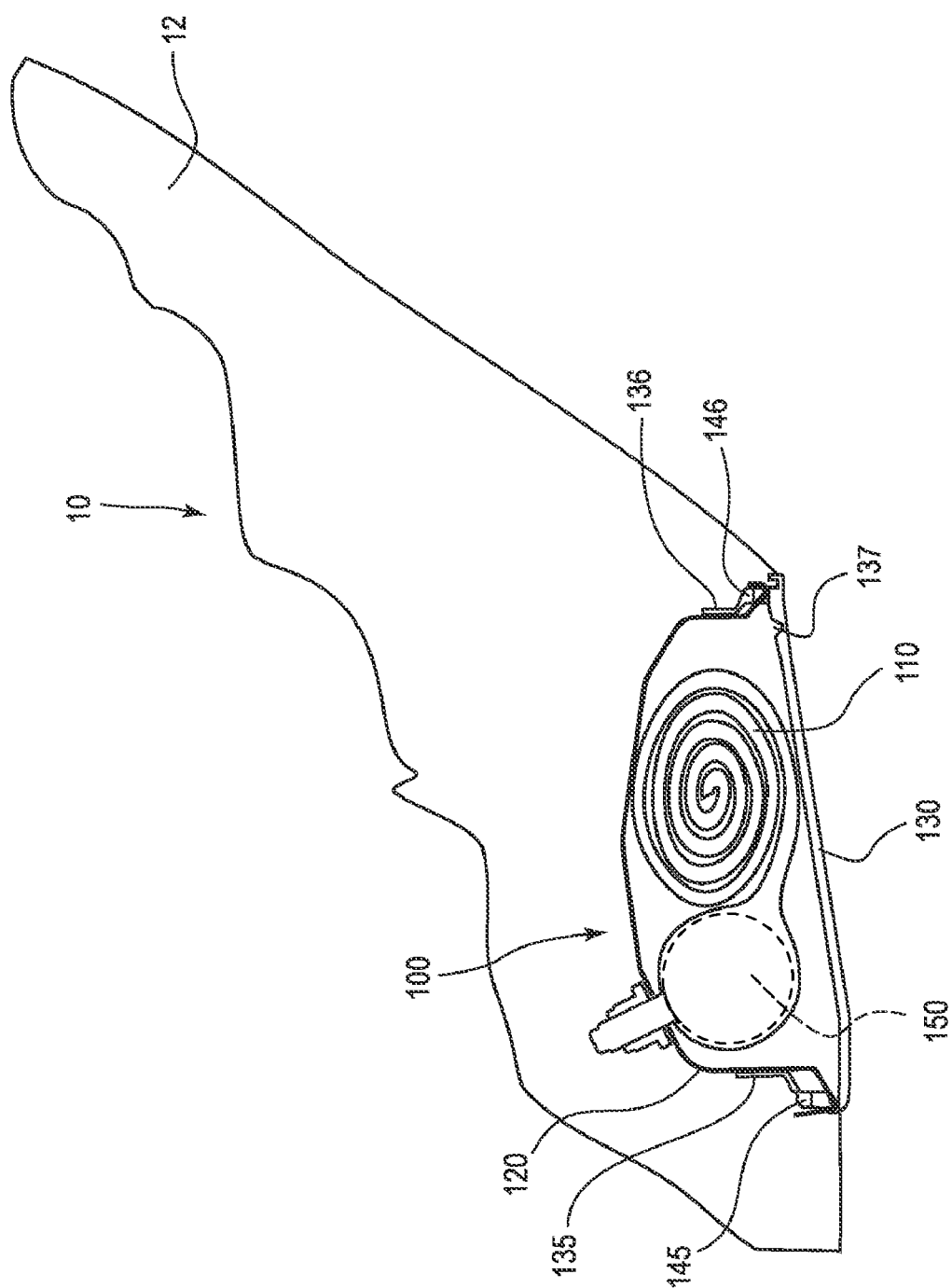
FIG. 1A is a side elevation view of an airbag assembly 100, wherein the assembly is in a packaged state and is located under a knee bolster of a vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

During installation, the airbags are rolled, folded, or both, and are retained in the packaged configuration behind a cover. During a collision event, vehicle sensors trigger the activation of an inflator, which rapidly fills the airbag with inflation gas. Thus the airbag rapidly changes confirmations from the packaged configuration to an expanded configuration.

FIGS. 1A-1D depict side elevation views of an airbag assembly 100, wherein the assembly comprises an inflatable knee airbag cushion 110, an airbag housing 120, a housing cover 130, and an inflator 150. Airbag assembly 100 is depicted as being in a low mount position in a knee bolster 12 of a vehicle 10. When in a low mount position, cover 130 may be said to be horizontally oriented and/or parallel with a floor of the vehicle. Cover 130 may comprise a tear seam 137 located on a car-rearward portion; a car-forward end cap 145 that extends to a car-forward tang 135; and a car-rearward end cap 146 that extends to a car-rearward tang 136. In other embodiments, the airbag assembly may be mounted in a mid- or high-mount position, which positions are well known in the art. For clarity, a lateral sidewall of housing 120 is not depicted.

Figure 1C:
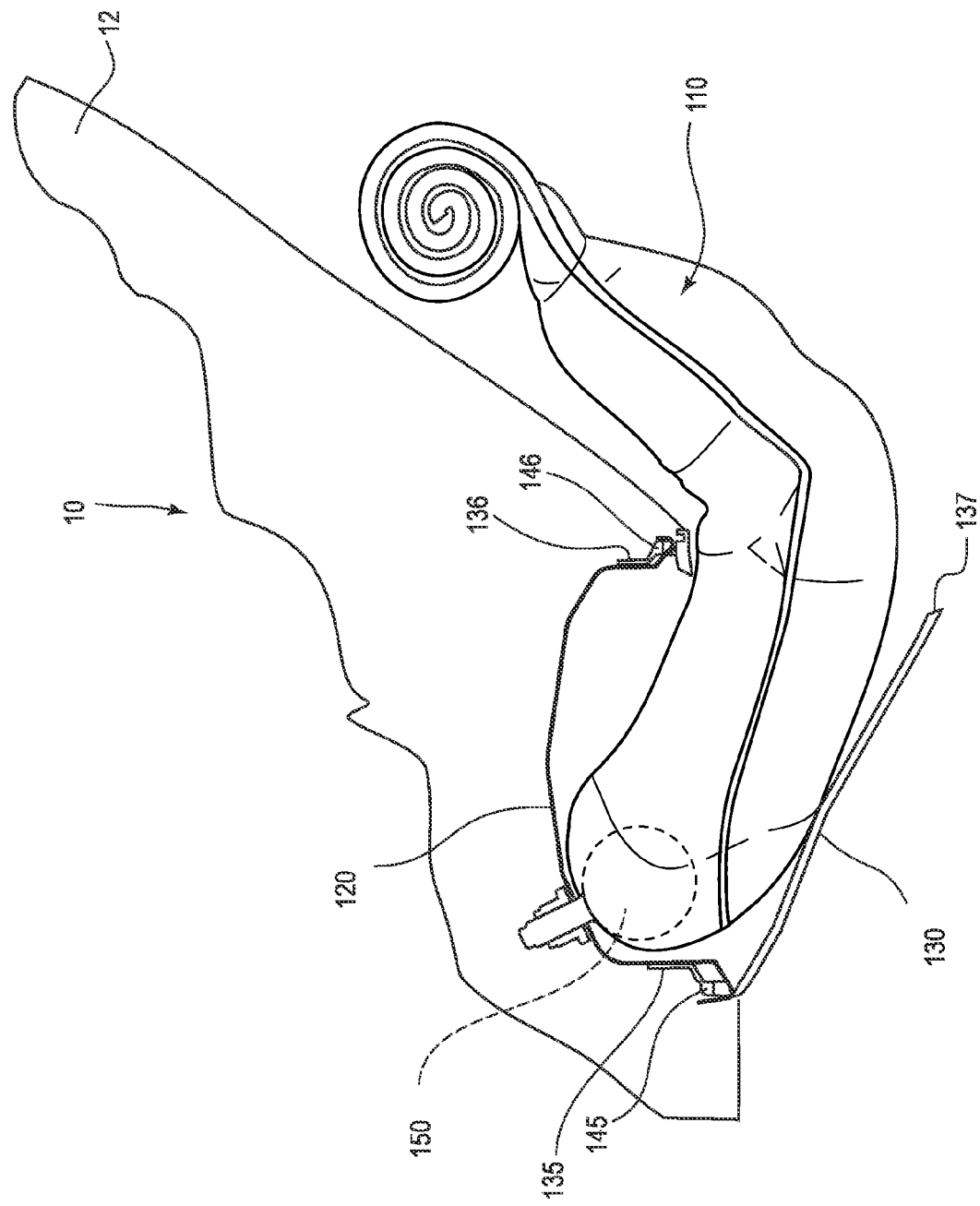
FIG. 1C is a side elevation view of the airbag assembly of FIG. 1B at a later time during airbag deployment.
Figure 1D:
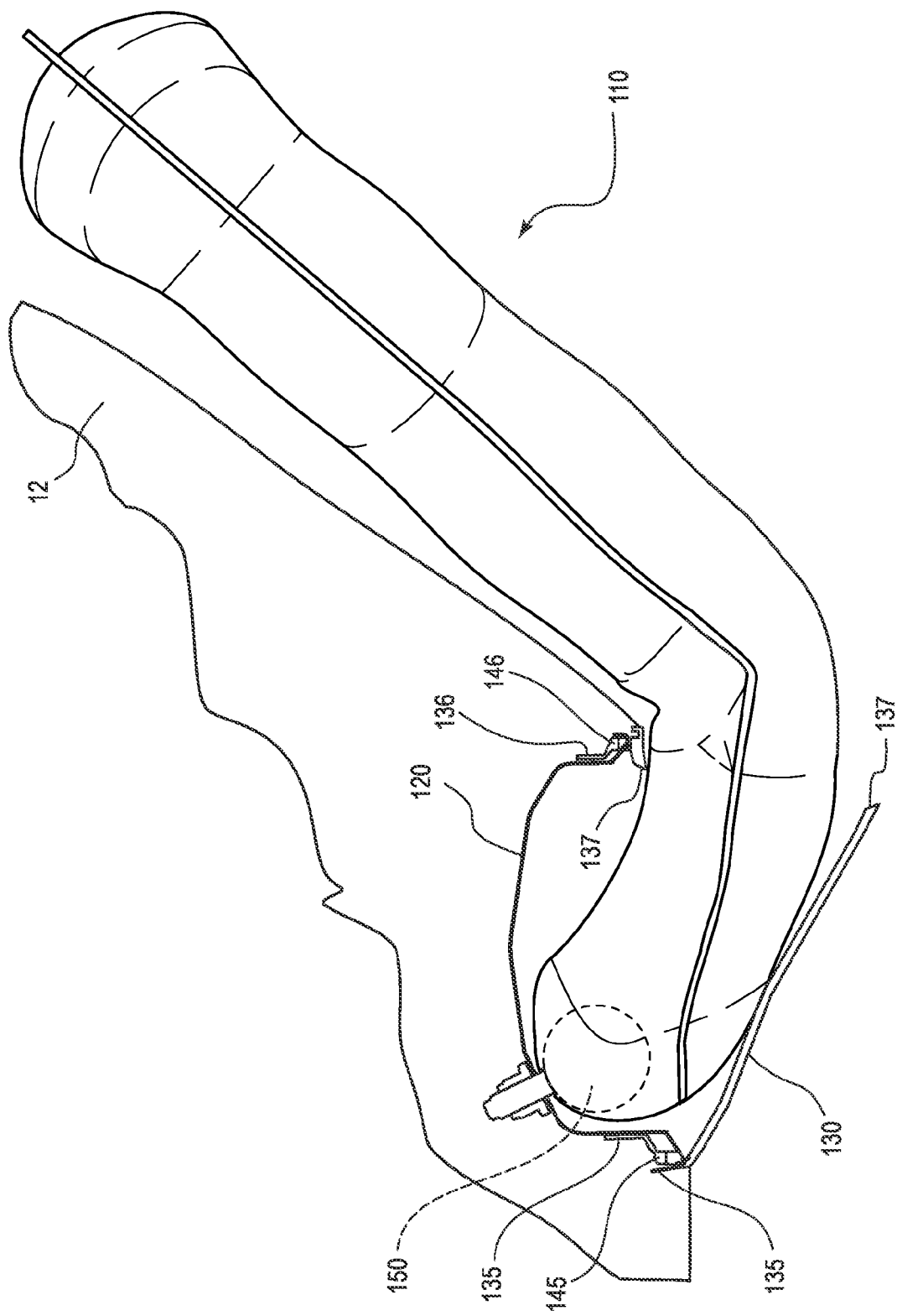
FIG. 1D is a side elevation view of the airbag assembly of FIG. 1C, wherein the airbag assembly is in an inflated, deployed configuration.

In the depiction of FIG. 1A, airbag assembly 100 is in a packaged configuration, wherein airbag 110 is in a rolled and/or folded state and is retained within housing 120 via cover 130. In the depiction of FIG. 1B, inflator 150 has been activated and airbag 110 has begun to be inflated. A tear seam 137 in cover 130 (see FIG. 1A) has ruptured and a portion of airbag 110 has exited housing 120 in a car-rearward direction. Cover 130 is configured to aid airbag 110 obtain an initial trajectory that may be described as being primarily car-rearward, rather than car-downward. In the depiction of FIG. 1C, inflator 150 is continuing to generate inflation gas such that airbag 100 is continuing to be inflated; however at this point in airbag deployment, a primary direction of airbag 110 deployment trajectory is in a car-upward and car-rearward direction, such that the airbag can be said to deploy parallel with knee bolster 12. FIG. 1D depicts airbag assembly 100 is in a deployed and inflated configuration. Airbag 110 may be said to be fully inflated. During and after inflatable knee airbag 110 deployment, cover 130 is configured to remain attached to housing 120 via car-forward tang 135 that extends from car-forward end cap 145 of the cover. Car-rearward tang 136 and car-rearward end cap 146 also remain coupled to housing 120, although the car-rearward end cap may be severed from the rest of cover 130 at tear seam 137.

As will be appreciated by those skilled in the art, a variety of types and configurations of inflatable knee airbags can be utilized without departing from the scope and spirit of the present disclosure. For example, the size, shape, and proportions of the airbag cushion may vary according to its use in different vehicles or different locations within a vehicle such that the airbag may comprise an inflatable curtain cushion; a rear passenger side airbag; a driver's airbag; a knee airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Also, the inflatable knee airbag may comprise one or more vents, which may be configured as discreet vents or dynamic vents. Generally, discreet vents do not change diameter during airbag deployment, and may not vary their capacity to vent inflation gas out the inflatable void of the airbag may not change during deployment. Dynamic vents may change diameter during airbag deployment and may vary their capacity to vent inflation gas out the inflatable void of the airbag may not change during deployment.

Figure 2A:
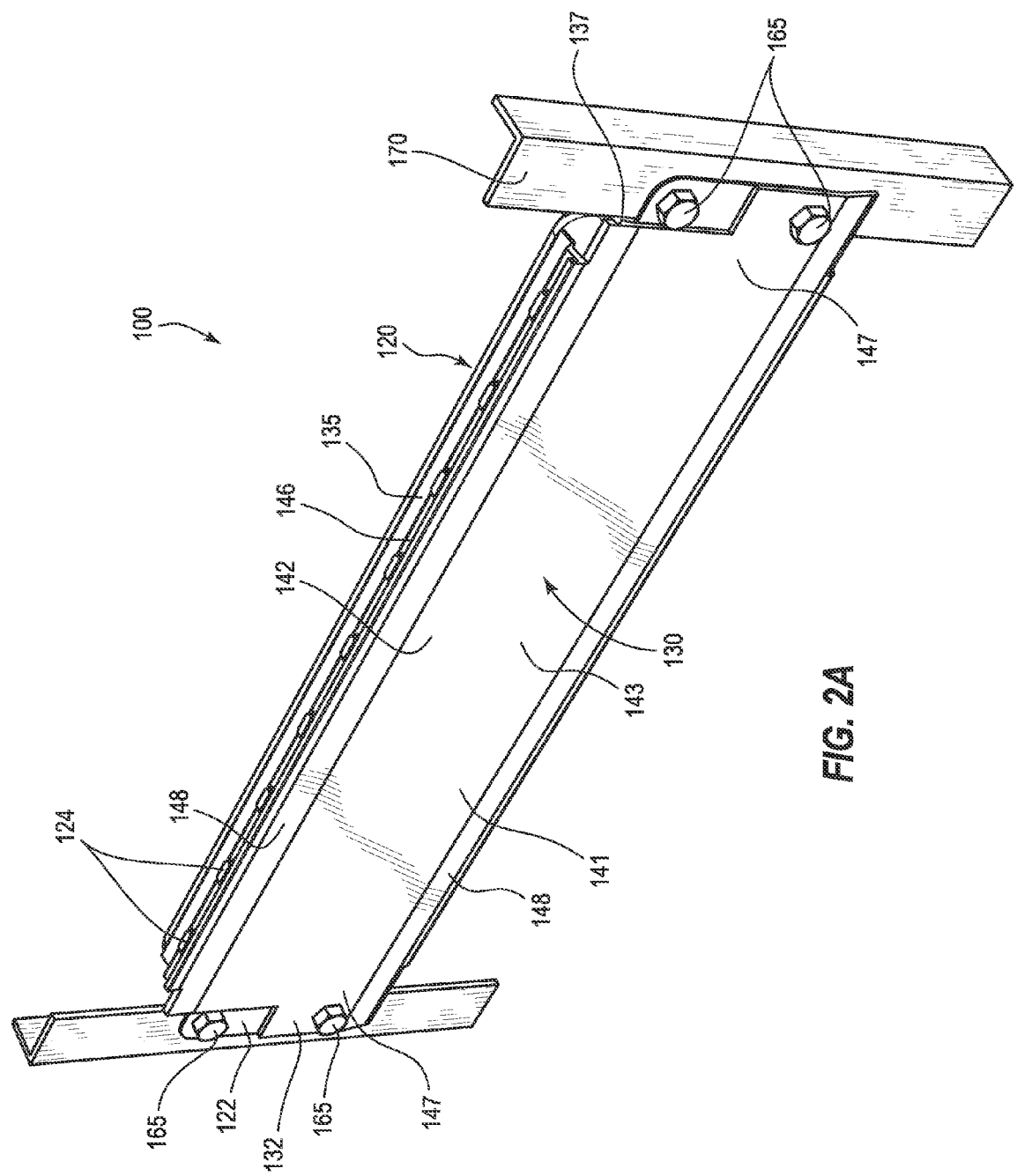
FIG. 2A is a perspective view of the airbag assembly of FIG. 1A, wherein the assembly is depicted before the airbag has been deployed.
Figure 2B:
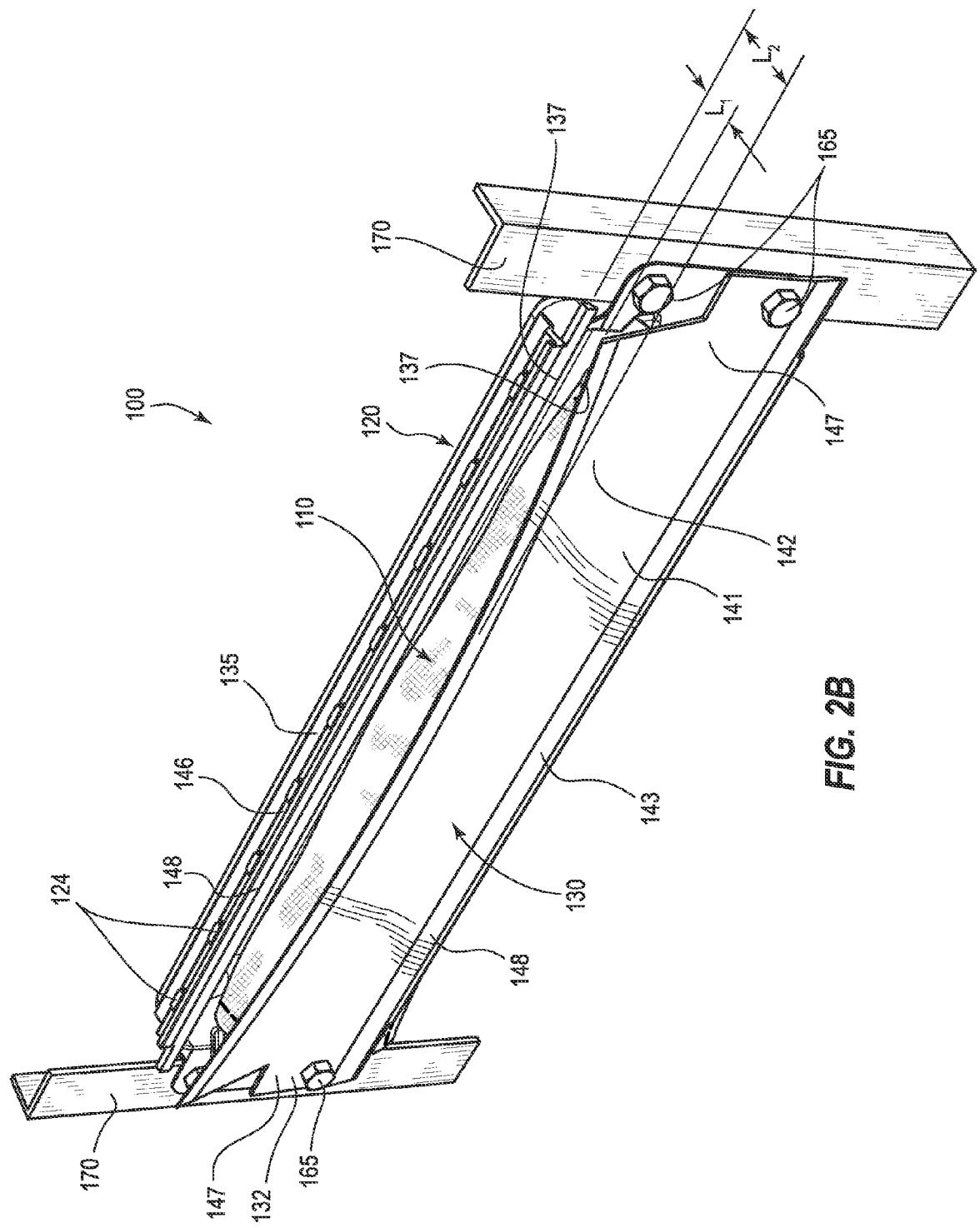
FIG. 2B is a perspective view of the airbag assembly of FIG. 2A after the airbag has begun to be deployed.
Figure 2C:
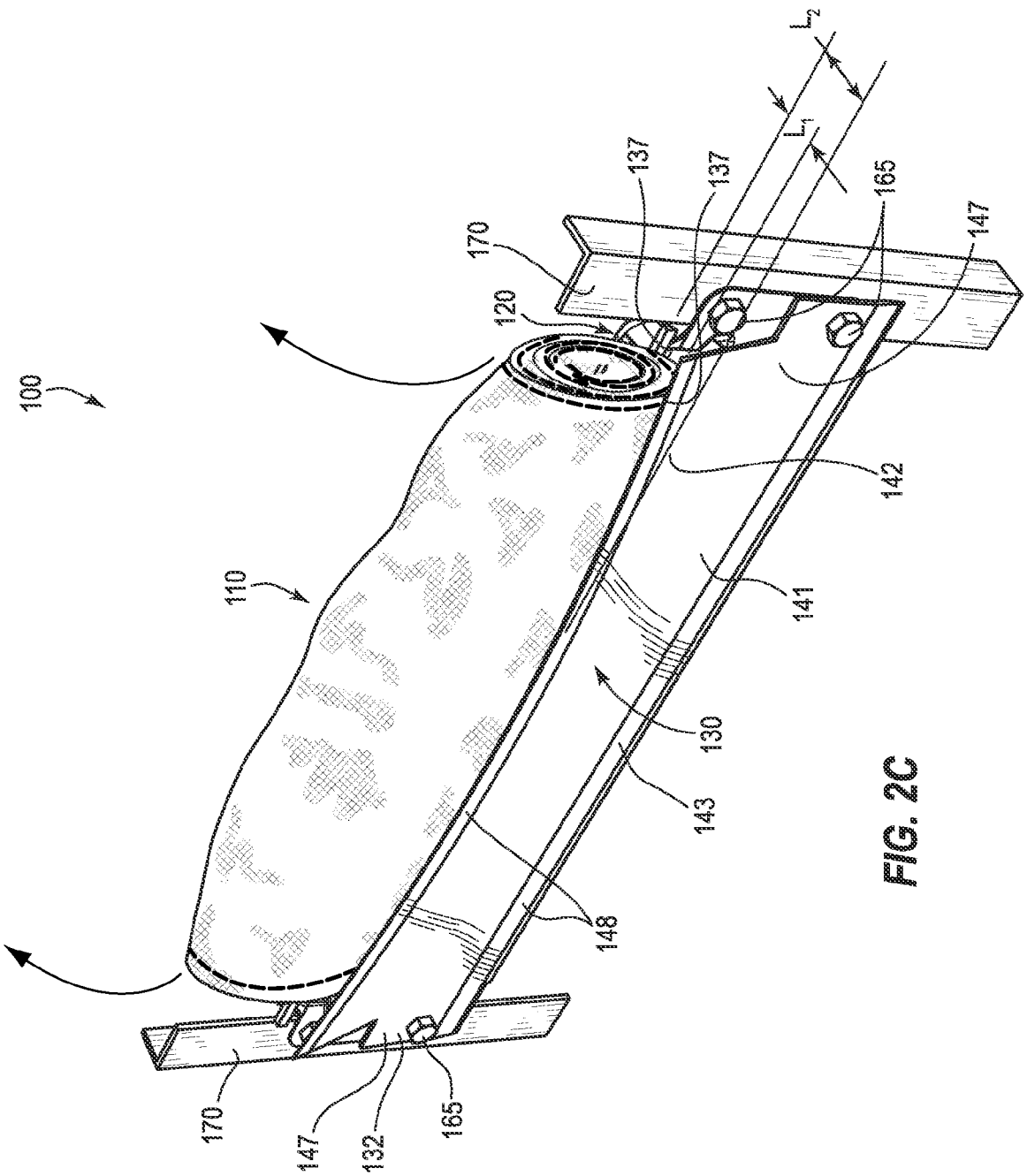
FIG. 2C is a perspective view of the airbag assembly of FIG. 2B at a later time during airbag deployment.

FIGS. 2A-2C are perspective views of the airbag assembly of FIG. 1A, wherein assembly 100 has been coupled to a vehicle structure 170 via mounting hardware 165. Cover 130 may comprise a planar rectangular shape, and therefore, may have two opposing lateral sides 147 and two opposing longitudinal sides 148. Each of the longitudinal sides 148 comprise end caps, such as car-rearward end cap 146; whereas neither lateral side 147 comprises an end cap. Cover 130 may be further described as having a car-forward portion 141 and a car-rearward portion 142. A center region 143 of cover 130 may be described as an approximate or exact center of the cover along a longitudinal axis that is parallel with longitudinal sides 148 and perpendicular to lateral sides 147. Tear seam 137 may run an entire longitudinal length of cover 130. Cover 130 may be partially coupled to housing 120 via hooks 124 on the housing engaging windows on car-rearward end cap 146. Hooks 124 and windows may be described as structures for coupling cover 130 to housing 120. In the depicted embodiment, cover 130 is also coupled to housing 120 at flange 122 and 132 of the housing and cover, via mounting hardware 165.

In the depiction of FIG. 2A, airbag assembly 100 is in a packaged and undeployed configuration. FIG. 2B may be said to depict an early phase of inflatable knee airbag deployment, wherein airbag 110 has begun to be inflated and has ruptured tear seam 137. When tear seam 137 ruptures, a car-rearward directed opening is formed through which airbag 110 can exit housing 120. The opening may be defined as a space between a car-forward end cap of tear seam 137 and a car-rearward end cap of the tear seam. A length $L_1$ may describe a magnitude of the opening at lateral sides 147 of cover 130. A length $L_2$ may describe a magnitude of the opening at center region 143, adjacent to the car-rearward longitudinal side 148 and/or car-rearward end cap 146. In the depicted embodiment, wherein cover 130 is coupled to housing 120 at the lateral sides 147 of the cover and lateral sidewalls of the housing, $L_1$ may be less than $L_2$.

As such, the shape formed by deploying inflatable knee airbag 110 and at least partially defined by tear seam 137, may be said to comprise an oval bisected along its major axis. In other words, during inflatable knee airbag 110 deployment, the tear seam in may be said to comprise a hemioval shape, a semioval shape, or a "smile" shape. Alternatively, if cover 130 comprises a more flexible material, an opening formed by the ruptured tear seam may comprise a shape that is different from those described above. For example, the cover may rotate around the hinge and/or at the point at which the cover is coupled to the airbag housing on the lateral sides of the housing and cover.

After tear seam 137 has been ruptured, cover 130 may comprise two separate pieces: a car-forward piece that comprises a car-forward portion, or end cap, of tear seam 137 and extends in a car-forward direction to a car-forward longitudinal side 148, as well as the car-forward and car-forward tang of cover 130.

In the depiction of FIG. 2C, airbag 110 may be said to be in an early phase of inflatable knee airbag deployment, wherein the phase of deployment is later than that depicted in FIG. 2B, but may still be considered an early phase. Airbag 110 has continued to be inflated and is beginning to exit housing 120 via the car-rearward directed opening formed by tear seam 137. Note that cover 130 may continue to be coupled to housing 120 via flanges 132 and 122. In such an embodiment, cover 130 may not rotate, or may rotate in a limited manner, around a hinge that is located on a car-rearward end cap of the cover. Rather, car-rearward portion 142 may be said to "pucker" or "smile". In other words, a length $L_1$ may be greater than a length $L_2$, wherein lengths L1 and L2 describe a magnitude of distance between car-forward and car-rearward end caps of ruptured tear seam 137. Cover 130 may not fully open during inflatable airbag 110 deployment. Cover 130 may be said to act as a deflector that encourages or causes airbag 110 to exit housing 120 in a direction that can be said to be primarily car-rearward. It may be said that cover 130 restricts a car-forward and a car-downward direction of travel of airbag 110.

Figure 3:
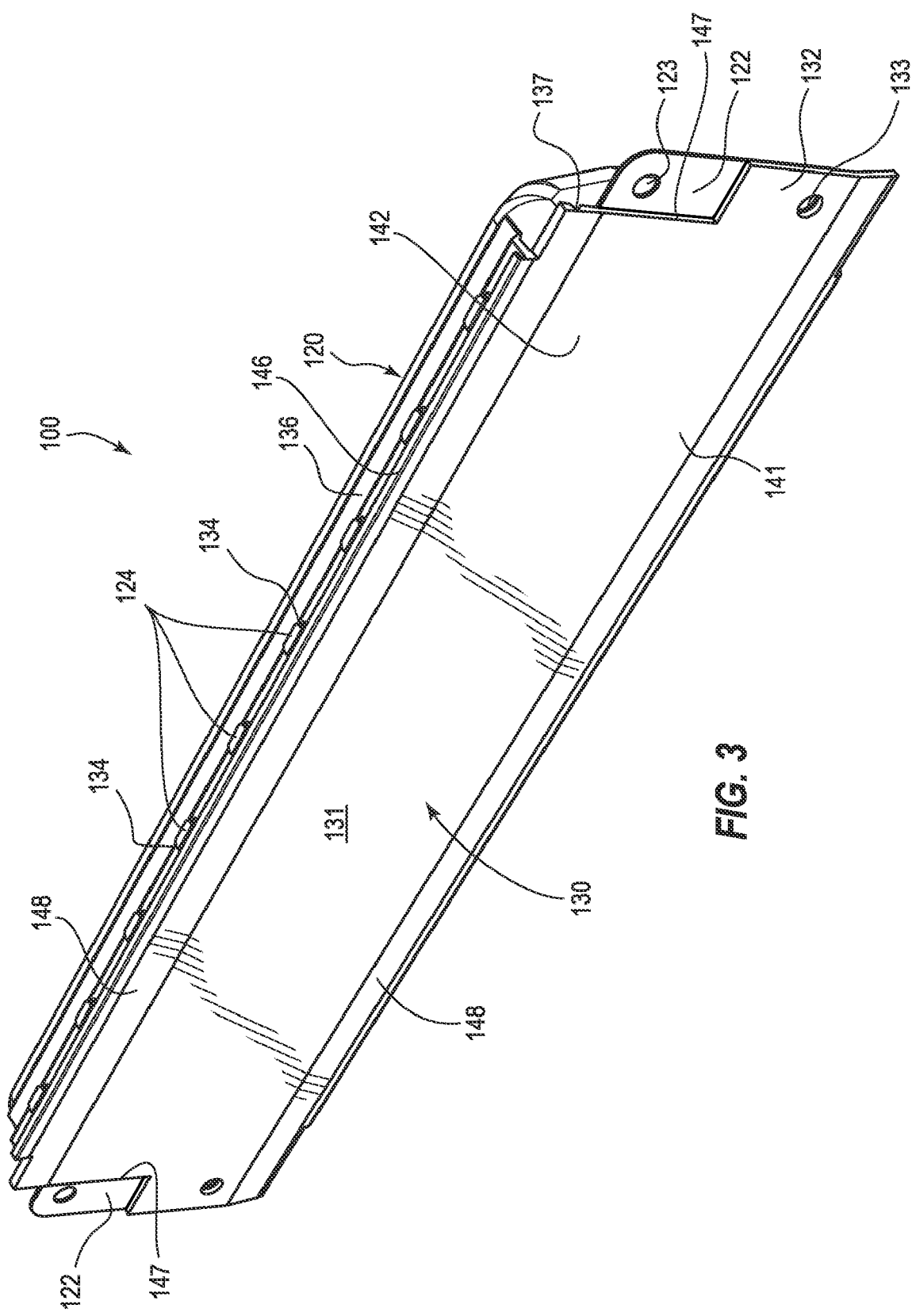
FIG. 3 is a front perspective view of a portion of airbag assembly 100.

FIG. 3 is a front elevation view of housing 120 and cover 130 of airbag assembly 100. Visible in the figure are portions of housing flanges 122, mounting apertures 123, and hooks 124. Cover 130 comprises an outside face 131, flanges 132, mounting apertures 133, windows 134, a car-rearward tang 136, and a tear seam 137. Mounting apertures 123 and 133 are configured to receive mounting hardware, which may be employed to aid in coupling cover 130 to housing 120 and/or couple airbag assembly 100 to a vehicle structure. Car-forward portion 141 and car-rearward portion 142 designate car-forward and car-rearward approximate halves of cover 130. Flanges 132 can be said to be located on lateral sides 147 of car-forward portion 141 of cover 130. Car-rearward end cap 146 is located on the car-rearward longitudinal side 148. Windows 134 are located on car-rearward end cap 146. Car-rearward tang 136 may be said to extend from end cap 146.

Figure 4:
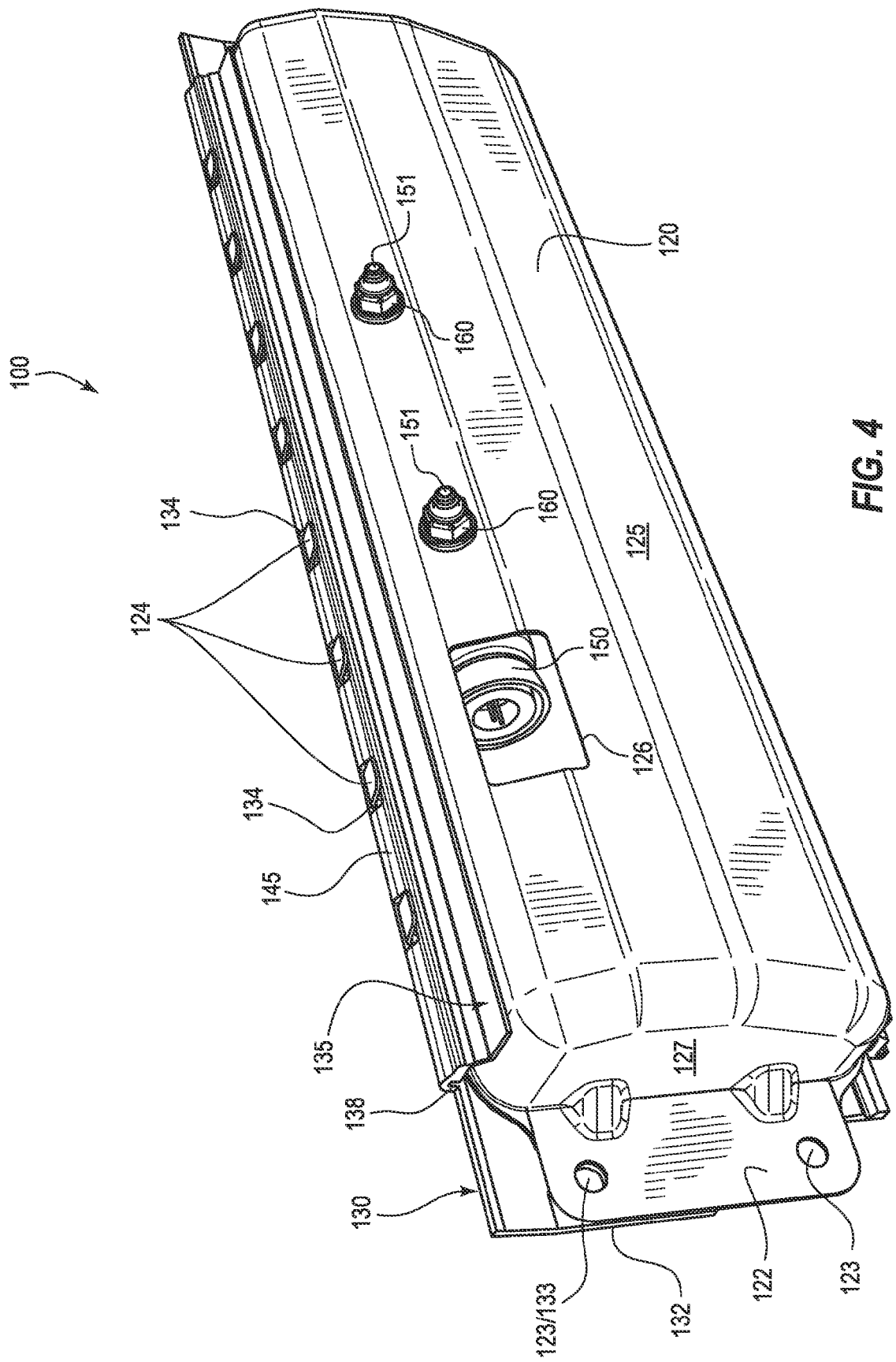
FIG. 4 is a rear perspective view of the airbag assembly of FIG. 2.

FIG. 4 is a rear perspective view of airbag assembly 100, wherein for clarity, the inflatable knee airbag cushion is not shown. Airbag housing 120 may comprise flanges 122, mounting apertures 123, hooks 124, a back wall 125, an inflator aperture 126, and a lateral sidewall 127. Visible in the figure are portions of cover 130, including flange 132, mounting aperture 133, windows 134, car-forward tang 135, and hinge 138. Windows 134 are located on car-forward end cap 145 of cover 130. Car-forward tang 135 may be said to extend from car-forward end cap 145. Hooks 124 and windows 134 may be described as structures for coupling cover 130 to housing 120. Inflator 150 is positioned within housing 120 and is partially visible through window 126. Mounting stems 151 of inflator 150 protrude through apertures in back wall 125 of housing 120. Mounting hardware 160 are coupled to mounting stems 151, such that inflator 150, the airbag (not visible), and housing 120 are coupled together. In the depicted embodiment, mounting stems 151 comprise threaded studs and hardware 160 comprise nuts.

One skilled in the art will recognize that a variety of types and configurations of airbag housings may be employed without departing from the spirit of the present invention. In one embodiment, the housing may comprise a stamped steel piece. In another embodiment, the housing may comprise steel and plastic.

Figure 6:
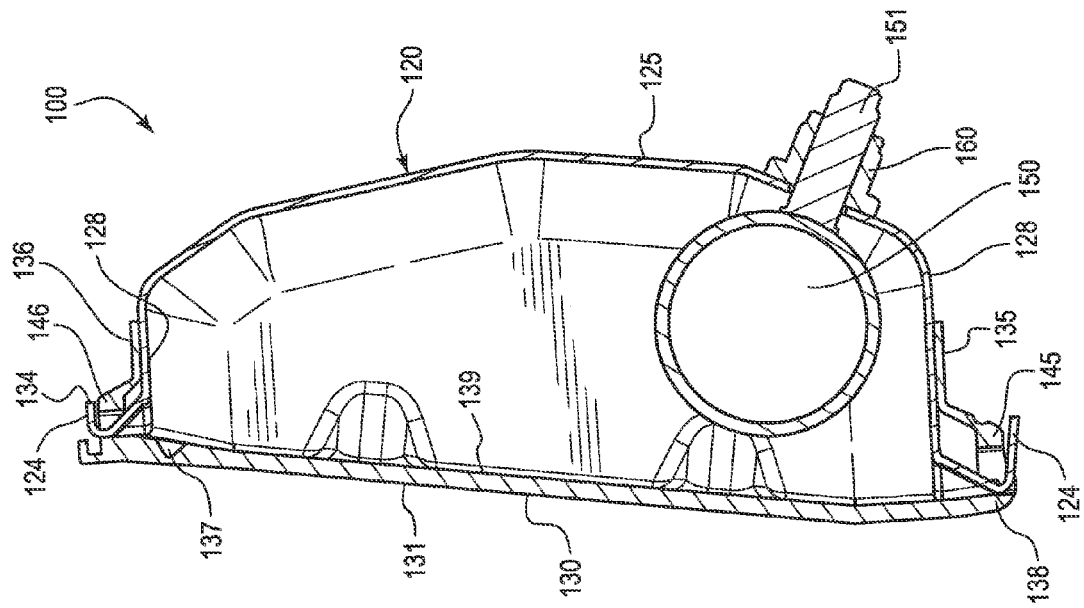
FIG. 6 is a cross-sectional view of airbag assembly 100.
Figure 5:
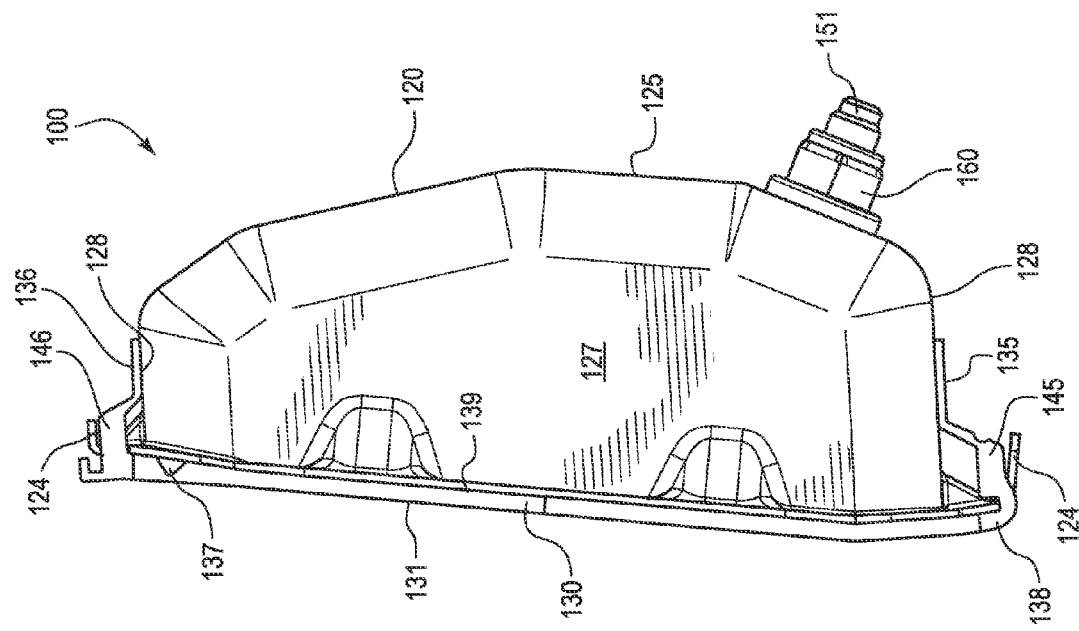
FIG. 5 is a side elevation view of airbag assembly 100.

FIGS. 5-6 depict side elevation and cross-sectional views of airbag assembly 100, wherein for clarity, the inflatable knee airbag is not depicted. Housing 120 may comprise hooks 124, back wall 125, lateral sidewall 127, and longitudinal sidewalls 128. Inflator 150 comprises mounting stems 151 that protrude through back wall 125 of housing 120, and are coupled to hardware 160. Cover 130 comprises an outside face 131, car-forward end cap 145, car-forward tang 135, car-rearward end cap 146, car-rearward tang 136, tear seam 137, hinge 138, and an inside face 139. Tangs 135 and 136 may lie adjacent to, and parallel to, longitudinal sidewalls 128 of housing 120. Hooks 124 of housing 120 protrude through windows 134 of cover 130 to retain the cover on the housing. Each tang 135 and 136 is configured to stiffen the cover against rotational forces encountered during inflatable knee airbag deployment, such that the cover remains coupled to housing 120 during and after inflatable knee airbag deployment.

One skilled in the art will recognize that a variety of types and configurations of airbag housings may be employed without departing from the spirit of the present invention. As such, the relative size, shape, and configuration of the airbag housing may vary from the depictions of cover 120. Further, as cover 120 is an extruded piece, some features of the cover may be formed after the cover has been extruded. For example, the tear seam and/or hinge may be formed or altered after extrusion via milling. Additionally, the windows may be formed post-extrusion, for example, via die cutting.

Figure 7:
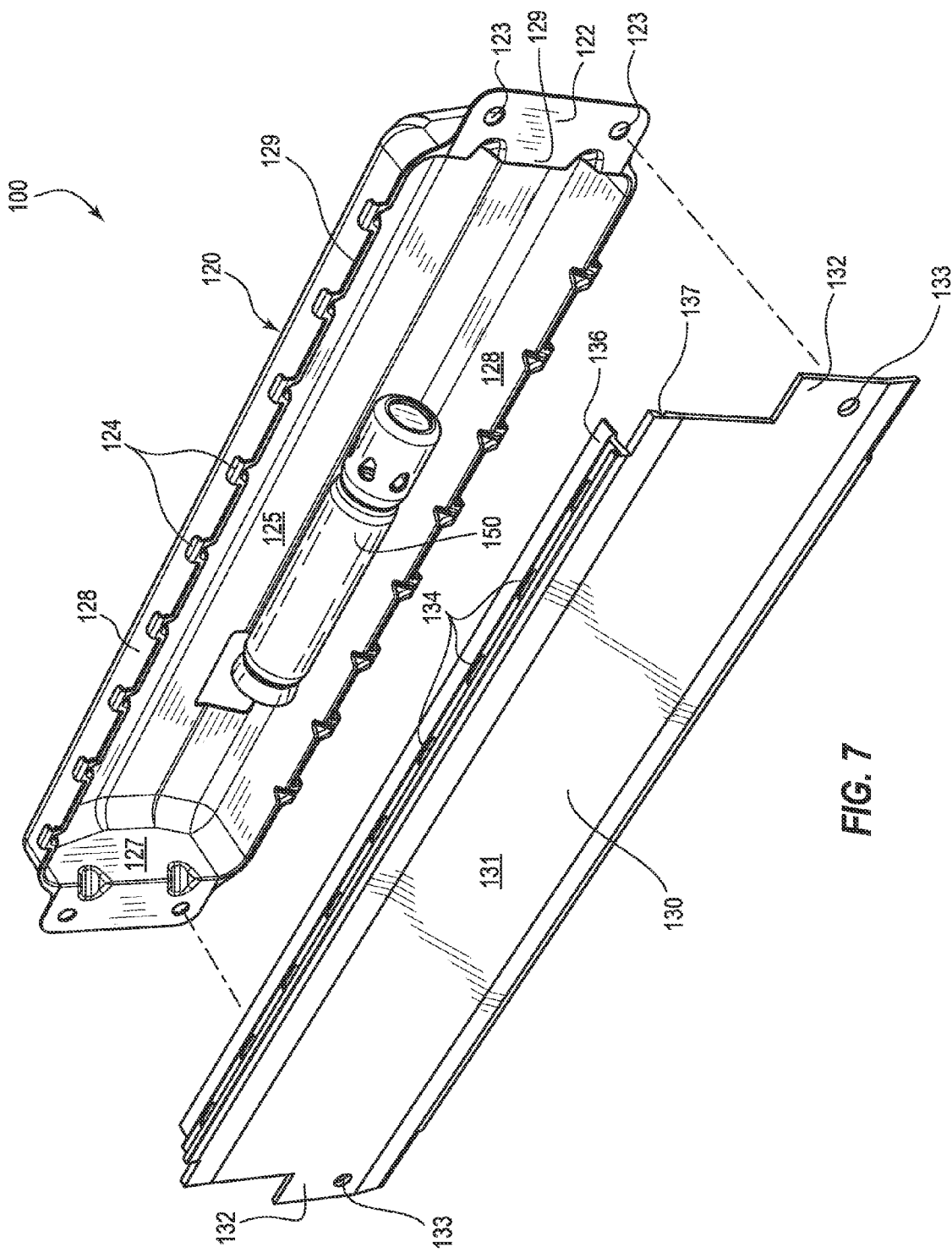
FIG. 7 is a partially exploded perspective view of airbag assembly 100.

FIG. 7 is a perspective view of airbag assembly 100, wherein cover 130 is removed from housing 120. Inflator 150 is positioned adjacent to an inside face of back wall 125. Hooks 124 are located on longitudinal sidewalls 128, which along with flange 122 form a rim 129, against which an inside face of cover 130 may rest. Flanges 122 extend away from lateral sidewalls 127. Cover 130 comprises an outside face 131, flanges 132, mounting apertures 133, windows 134, car-rearward tang 136, and tear seam 137.

Hooks 124 may be regularly spaced on one or both longitudinal sidewalls 128 of housing 120. Windows 134 of cover 130 may be located on one or more tangs 135 and 136, which may extend from one or more longitudinal sidewalls 148 of the cover. Windows 134 may be regularly spaced in a manner that corresponds with hooks 124, such that in an assembled, or packaged configuration, the hooks protrude through the windows, thereby retaining the cover on the housing. In the assembled, or packaged configuration, flange 132 located on each lateral side 147 of cover 130, is configured to be located adjacent to, and parallel with at least a portion of flange 122, located on lateral sidewall 127 of housing 120. Mounting apertures 133 are configured to align with at least one mounting aperture 123 of flange 122. Mounting apertures 133 and 123, as well as flange 122 may be employed in coupling inflatable knee airbag assembly 100 to a vehicle structure.

Figure 8:
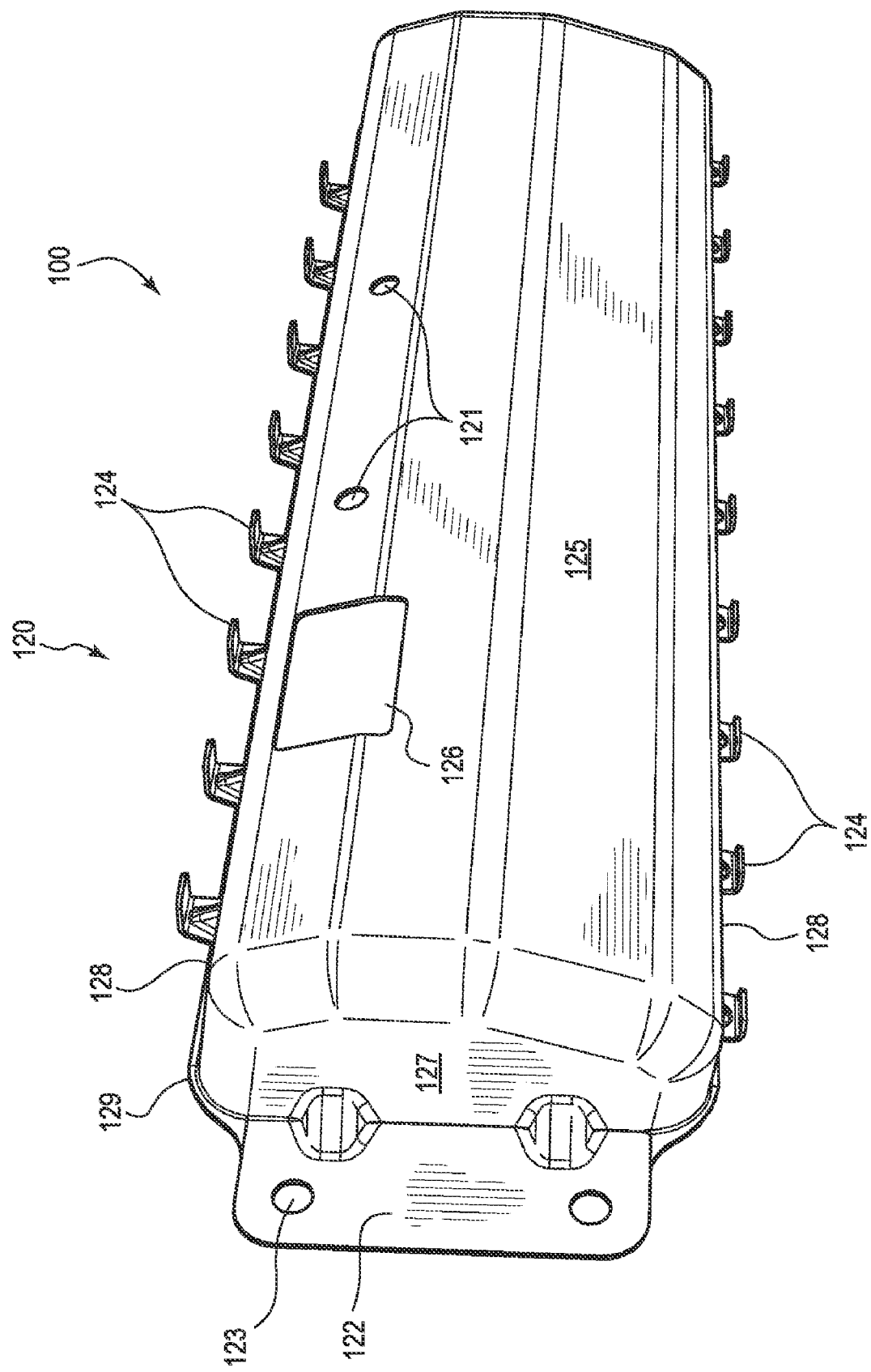
FIG. 8 is a rear perspective view of a housing of airbag assembly 100.

FIG. 8 is a close-up perspective view of housing 120, which may be a component of airbag assembly 100. Housing 120 may comprise one or more apertures 121 for receiving inflator mounting stem apertures, flange 122, mounting apertures 123, hooks 124, back wall 125, window 126, lateral sidewall 127, longitudinal sidewalls 128, and rim 129.

Figure 9:
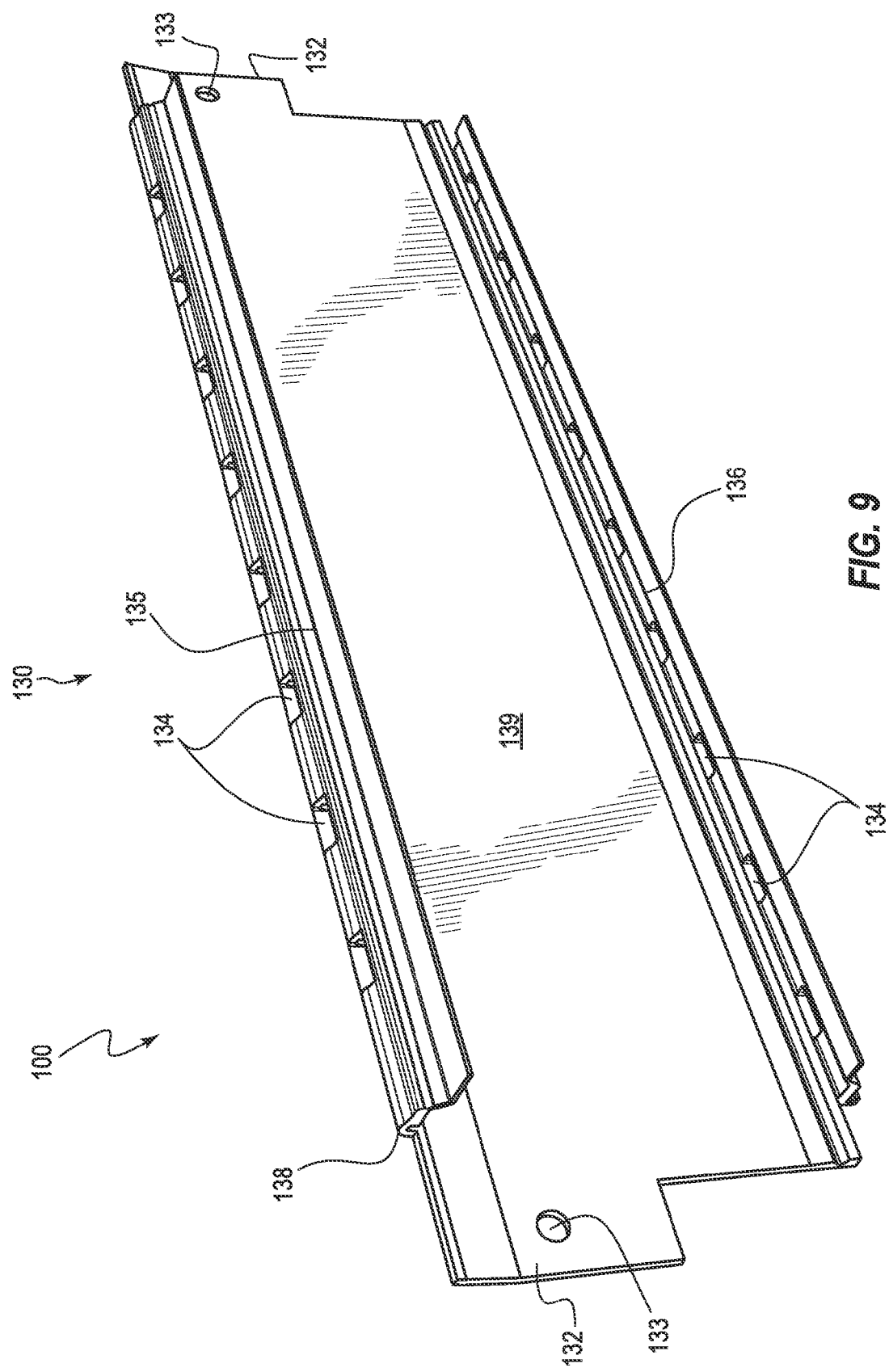
FIG. 9 is a rear perspective view of a cover of airbag assembly 100.

FIG. 9 is a close-up perspective view of cover 130, which may be a component of airbag assembly 100. Cover 130 may comprise flange 132, mounting aperture 133, windows 134, car-forward tang 135, car-rearward tang 136, hinge 138, and inside face 139. It may be said that cover 130 does not comprise lateral end caps.

Figure 11:
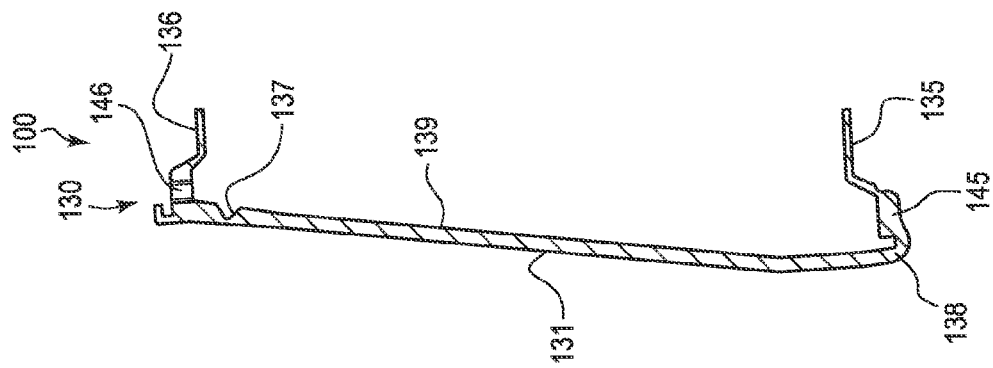
FIG. 11 is a cross-sectional view of the cover of FIG. 9.
Figure 10:
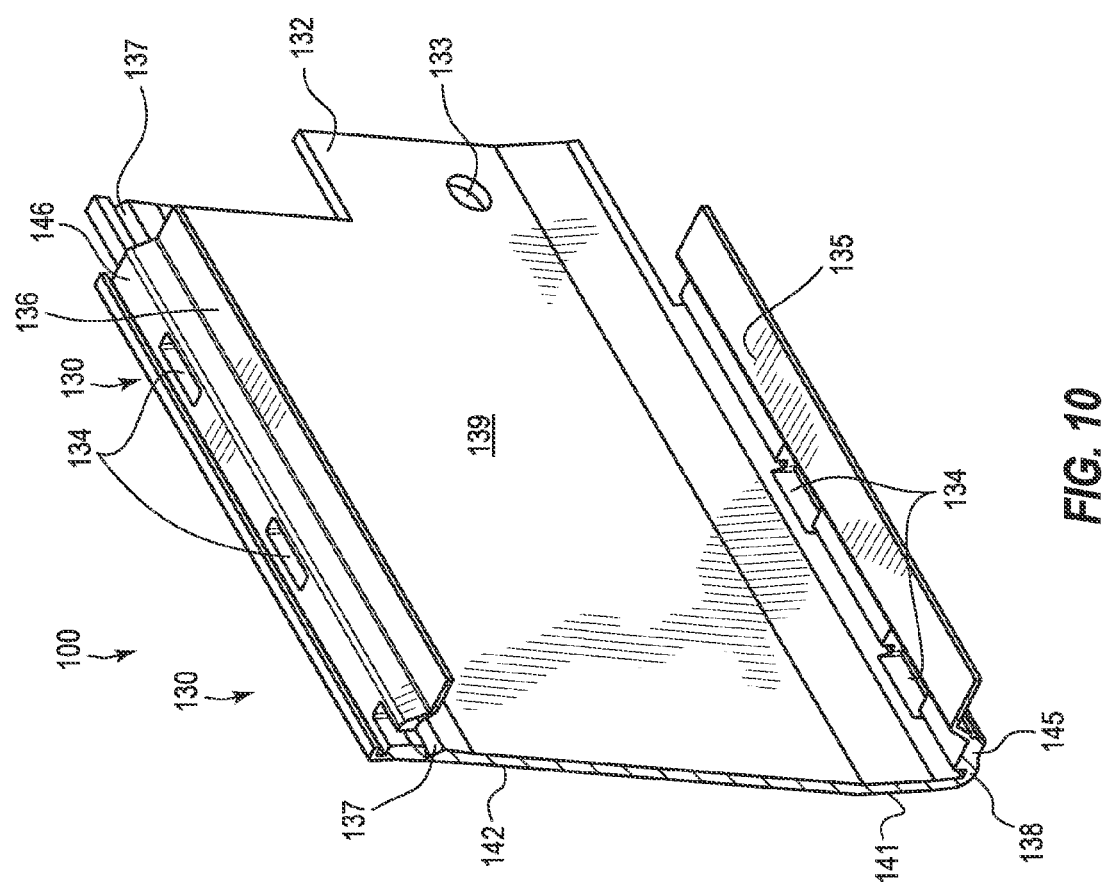
FIG. 10 is a close-up cutaway perspective view of the cover of FIG. 8.
Figure 12:
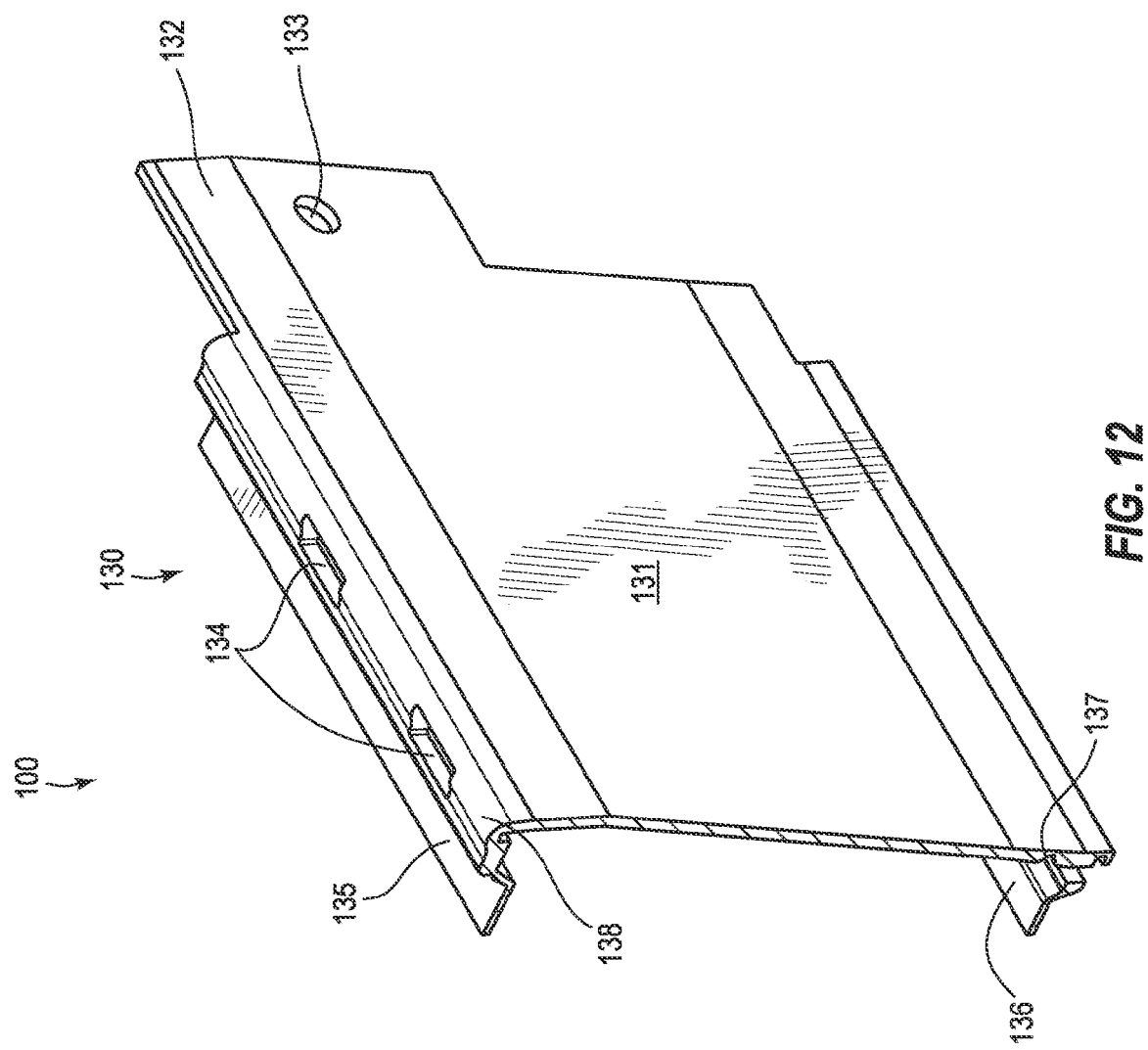
FIG. 12 is a close-up cutaway perspective view of the cover of FIG. 9.

FIGS. 10-12 are views, of cover 130, which may be a component of airbag assembly 100. FIG. 9 is a cutaway perspective view; FIG. 11 is a cross-sectional view; and FIG. 12 is a cutaway perspective view, wherein the cover has been rotated 180 degrees, relative to FIG. 10. Visible in the figures are inside face 131, flange 132, mounting aperture 133, windows 134, car-forward end cap 145, car-forward tang 135, car-rearward end cap 146, car-rearward tang 136, tear seam 137, hinge 138, and inside face 139. Cover 130 may be divided into car-forward portion 141 and car-rearward portion 142.

FIGS. 13-16B depict another embodiment of an inflatable airbag assembly 200 with a cover 220, wherein assembly 200 and cover 220 resemble assembly 100 and cover 120, described above, in certain respects. Accordingly, like features may be designated with like reference numerals, with the leading hundreds numeral incremented from "1" to "2". Any suitable combination of the features described with respect to assembly 100 can be employed with assembly 200, and vice versa.

Figure 13:
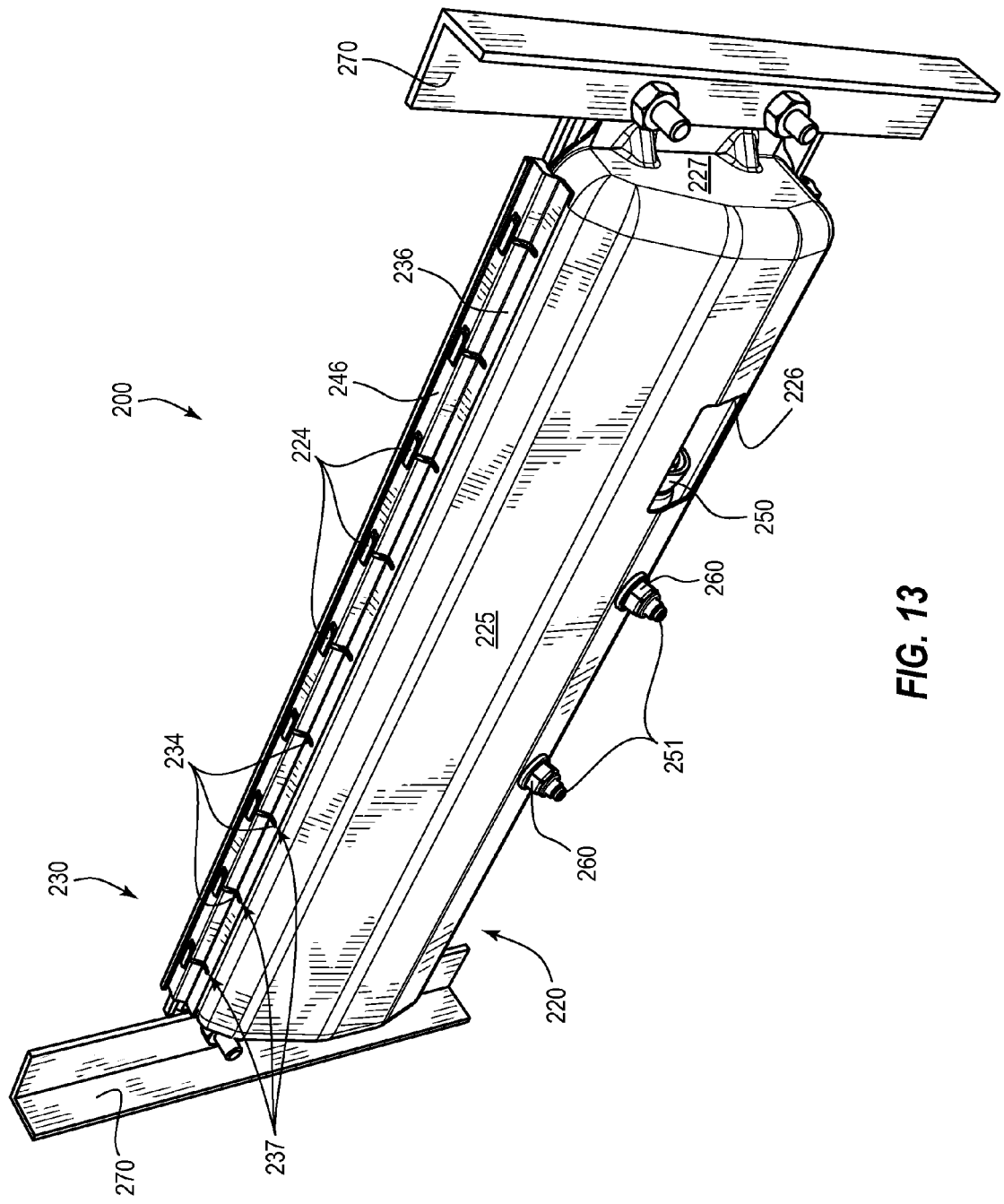
FIG. 13 is a perspective view of another embodiment of an inflatable airbag assembly.

FIG. 13 is a perspective view of airbag assembly 200, wherein the assembly is mounted to a vehicle structure 270. Airbag housing 220 may comprise hooks 224, a back wall 225, an inflator aperture 226, and a lateral sidewall 227. Visible in FIG. 13 are portions of cover 230, including windows 234, car-rearward tang 235, and car-rearward end cap 246. Windows 234 are located on car-rearward end cap 246 of cover 230. Car-rearward tang 236 may be characterized as extending from car-rearward end cap 246. Hooks 224 and windows 234 may be described as structures for coupling cover 230 to housing 220. Inflator 250 is positioned within housing 220 and is partially visible through window 226. Mounting stems 251 of inflator 250 protrude through apertures in back wall 225 of housing 220. Mounting hardware 260 are coupled to mounting stems 251, such that inflator 250, the airbag (not visible), and housing 220 are coupled together. In the depicted embodiment, mounting stems 251 comprise threaded studs and hardware 260 comprise nuts.

Figure 14:
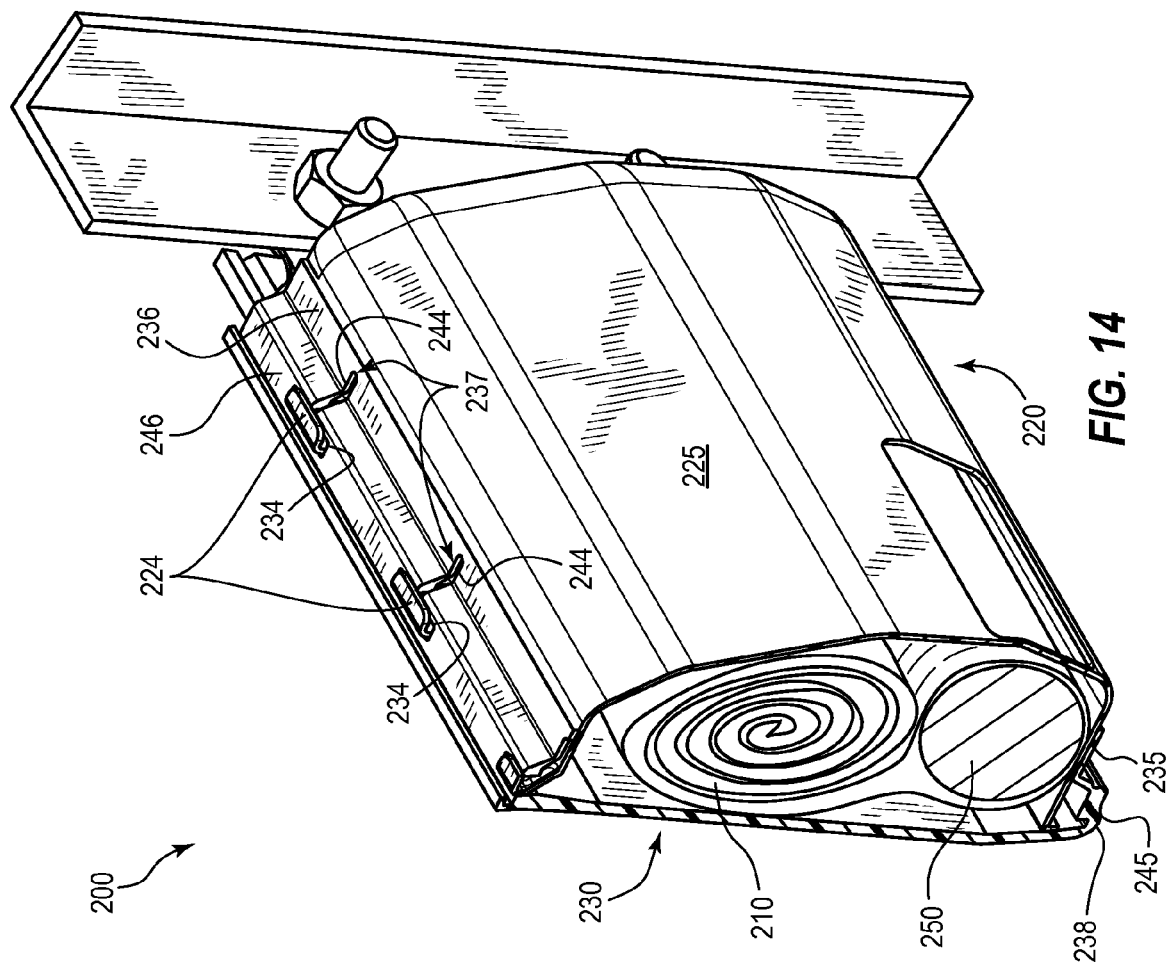
FIG. 14 is a cutaway perspective view of the inflatable airbag assembly of FIG. 13.
Figure 15:
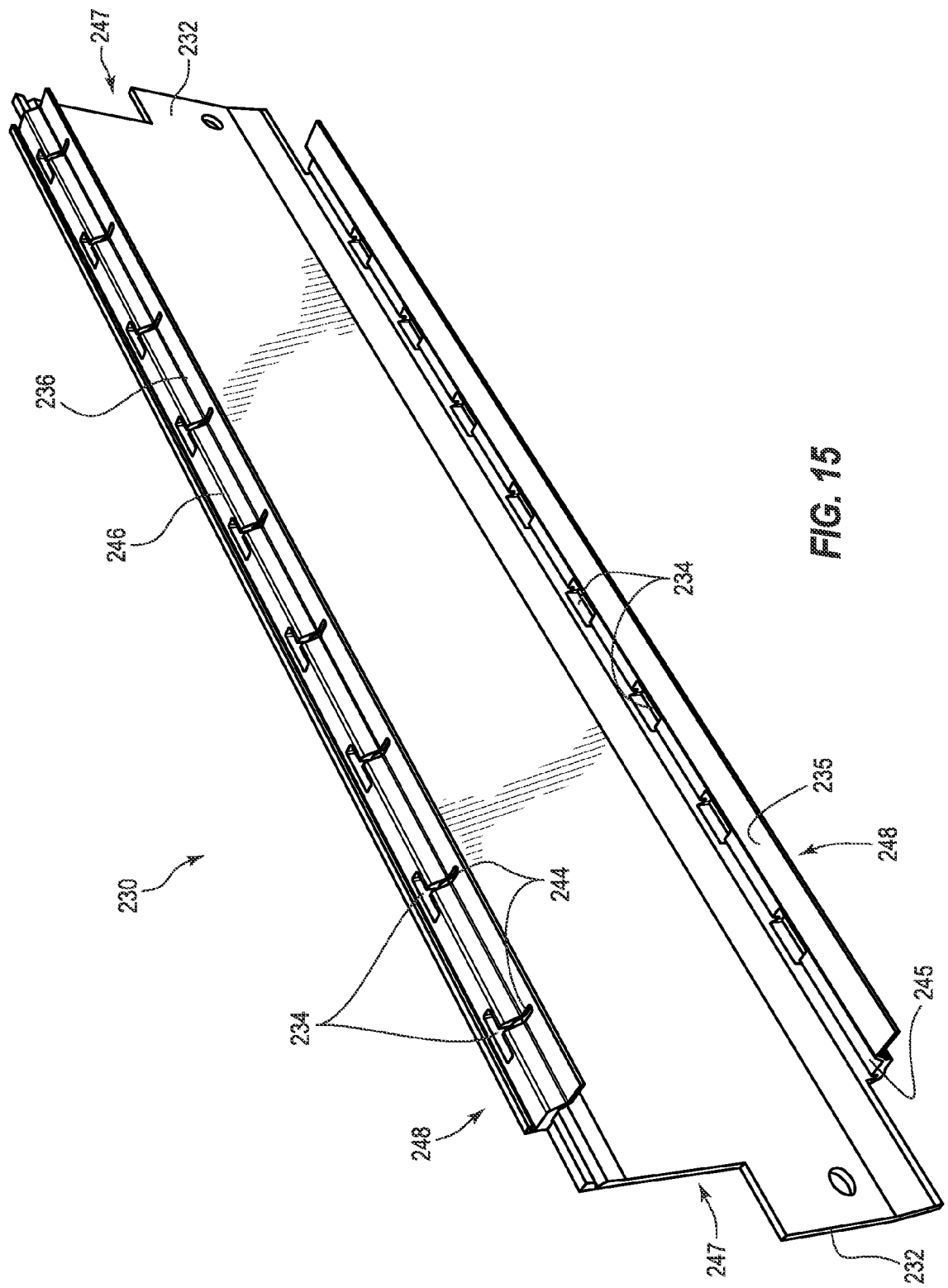
FIG. 15 is a perspective view of an airbag housing cover, which comprises a portion of the airbag assembly of FIG. 14.

FIG. 14 is a cutaway perspective view of airbag assembly 200 of FIG. 15. Assembly 200 may comprise an inflatable airbag 210, housing 220, cover 230, and inflator 250. Housing 220 has a back wall 225. Cover 230 may comprise windows 234 with a plurality of extensions 244, car-forward end cap 245, car-forward tang 235, car-rearward end cap 246, car-rearward tang 236, tear seam 237, and a hinge 238. Extensions 244 collectively comprise the tear seam 237. During inflatable airbag deployment, inflatable airbag 210 applies pressure on cover 220. When a predetermined magnitude of force has been applied to cover 220, each of the window extensions 244 are configured to rupture, or in other words, tear in a direction of an outside edge of car-rearward tang 236. When window extensions 244 rupture, car-rearward end cap 246 of cover 230 can become uncoupled from hooks 224 of housing 220. Alternatively, window extensions 244 may not rupture, but rather, may allow hooks 224 to pull through window 234 and window extensions 244, and thereby allow cover 230 to become uncoupled from housing 220.

FIG. 15 is a close-up perspective view of cover 230, which may be a component of airbag assembly 200. Cover 230 may comprise flange 232, windows 234, car-forward tang 235, car-rearward tang 236, hinge 238, car-forward end cap 245, car-rearward end cap 246, lateral sides 247, and longitudinal sides 248. It may be said that lateral sidewalls 247 of cover 230 do not comprise lateral end caps.

Figure 16A:
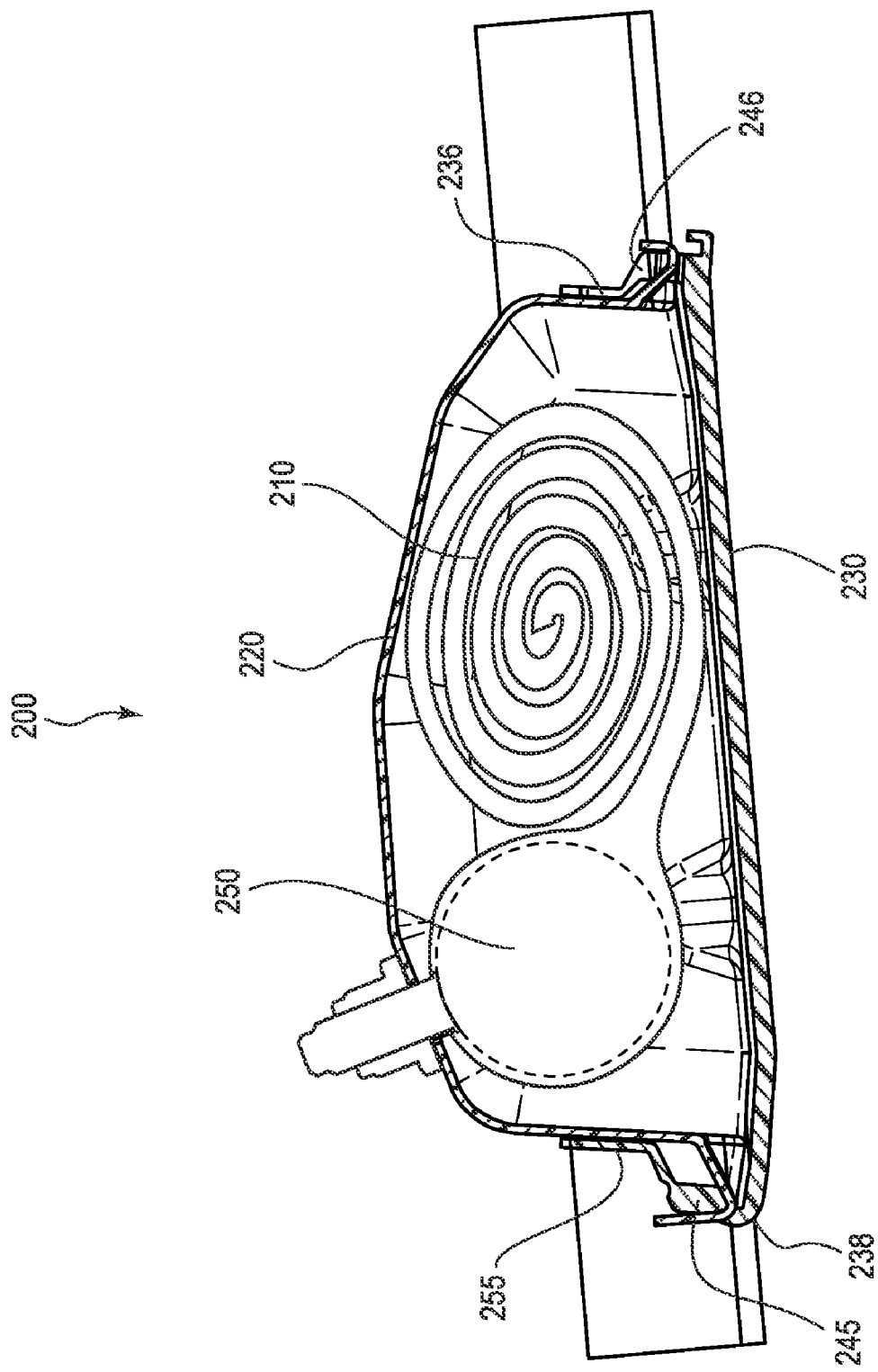
FIG. 16A is a cross-sectional view of the airbag assembly of FIG. 14.
Figure 16B:
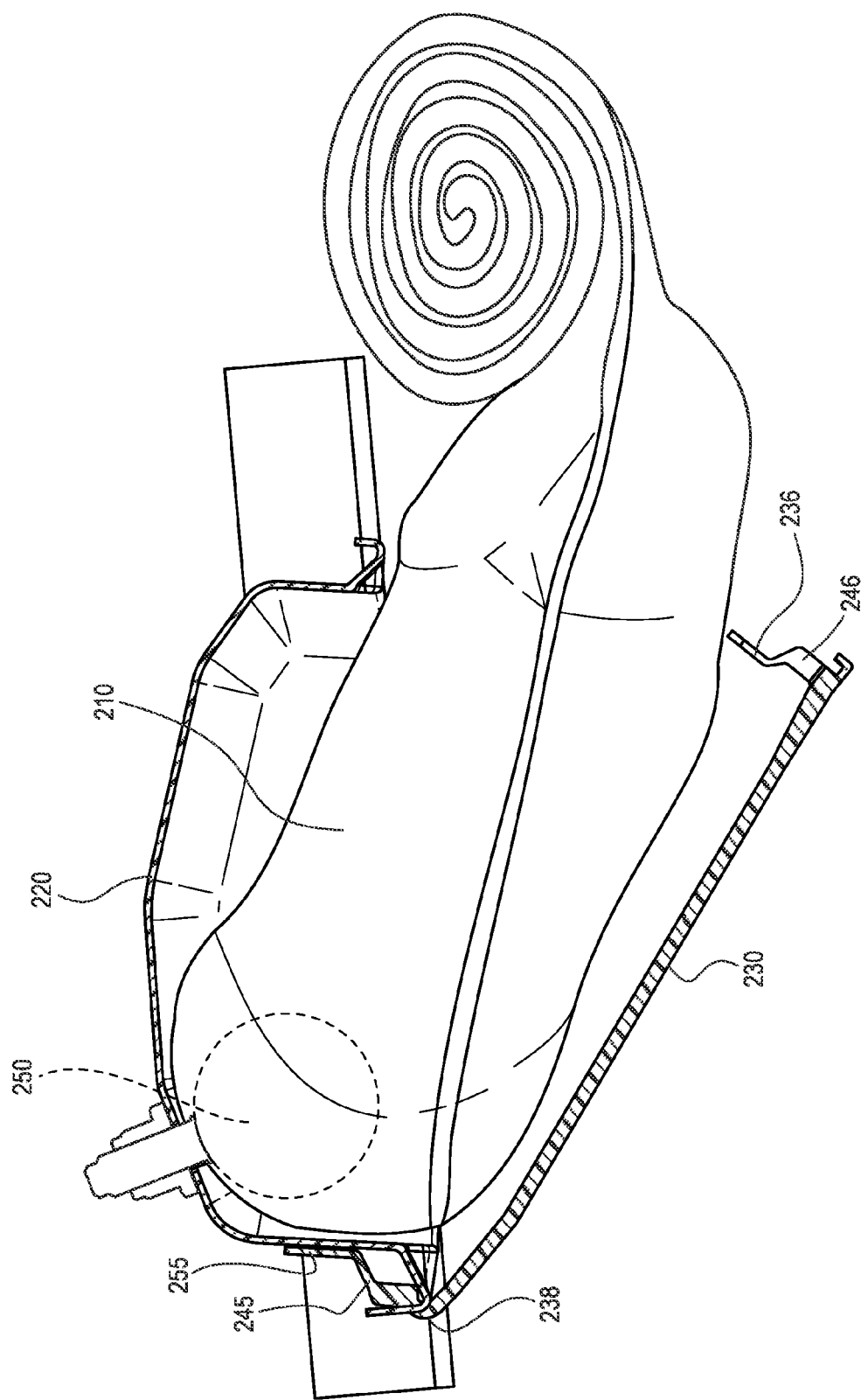
FIG. 16B is a cross-sectional view of the airbag assembly of FIG. 16A, after the airbag has begun to be deployed.

FIGS. 16A-16B depict cross-sectional views of airbag assembly 200, wherein in FIG. 16A, the assembly is in a packaged configuration, and in FIG. 16B, the assembly is in a deployed configuration. Assembly 200 may comprise an inflatable airbag 210, an airbag housing 220, a cover 230, and an inflator 250. Cover 230 comprises a car-forward end cap 245 that has a car-forward tang 235; a hinge 238; and a car-rearward end cap 246 with a car-rearward tang 236. In the packaged configuration, cover 230 may be coupled to housing 220 at both car-forward end cap 245 and car-rearward end cap 246. In the deployed configuration, car-rearward end cap 246 becomes uncoupled from housing 220, such that cover 230 can rotate about hinge 238.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An inflatable knee airbag assembly comprising:
an inflatable knee airbag;
an inflator coupled to the inflatable knee airbag;
a housing coupled to the inflator, wherein the inflatable knee airbag is retained within the housing when the assembly is in a packaged configuration; and
a cover coupled to the housing, wherein the cover comprises:
a car-forward longitudinal side that comprises an end cap coupled to the housing via a first set of structures;
an opposing car-rearward longitudinal side that comprises an end cap coupled to the housing via a second set of structures;
two opposing lateral sides that are coupled to the housing; and
a tear seam at only the car-rearward longitudinal side of the cover,
wherein the inflatable knee airbag is configured to be expanded by the inflator to rupture the tear seam, and wherein, when the inflatable knee airbag is inflated:
the knee airbag extends through the ruptured tear seam to exit the housing in a primarily car-rearward direction; and
the end caps of both the car-forward longitudinal side and the car-rearward longitudinal side of the cover remain coupled to the housing via the first and second sets of structures.

2. The inflatable knee airbag of claim 1, wherein the cover is formed from a unitary piece of extruded plastic.

3. The inflatable knee airbag of claim 1, wherein the tear seam runs along an entire longitudinal length of the cover.

4. The inflatable knee airbag assembly of claim 1, wherein each of the two opposing lateral sides of the cover comprises a flange, and wherein the flanges of the opposing lateral sides are coupled to the housing at only a car-forward portion of the cover.

5. An inflatable knee airbag assembly comprising:
an inflatable knee airbag;
an inflator coupled to the inflatable knee airbag;
an airbag housing coupled to the inflator, wherein the inflatable knee airbag is retained within the housing when the assembly is in a packaged configuration; and
a cover coupled to the housing, wherein the cover has comprises:
a car-forward longitudinal side that is coupled to the housing;
a car-rearward longitudinal side that is coupled to the housing, the car-rearward longitudinal side comprising a tear seam; and
two opposing lateral sides that are coupled to the housing at a car-forward portion of the cover and are not coupled to the housing at a car-rearward portion of the cover,
wherein, when the inflatable knee airbag is deployed:
both the car-forward longitudinal side and the car-rearward longitudinal side of the cover remain coupled to the housing;
the two lateral sides of the cover remain coupled to the housing at the car-forward portion of the cover to limit an ability of the cover to rotate about its car-forward longitudinal side;
the tear seam is ruptured to at least partially defines define an opening with a smile shape through which the inflatable knee airbag exits the housing in a primarily car-rearward direction; and
the two lateral sides of the cover at the car-rearward portion of the cover are moved away from the housing.

6. The inflatable knee airbag assembly of claim 5, wherein the car-forward longitudinal side and the car-rearward longitudinal side each comprise end caps, and wherein each of the end caps comprise structures for coupling the cover to the housing.

7. The inflatable knee airbag assembly of claim 6, wherein the tear seam runs parallel to the car-rearward end cap.

8. The inflatable knee airbag assembly of claim 7, wherein the tear seam is located between the car-rearward end cap and the car-forward portions of the lateral sides.

9. The inflatable knee airbag assembly of claim 5, wherein the tear seam runs along an entire longitudinal length of the cover and is restricted to only the car-rearward longitudinal side of the cover.

10. The inflatable knee airbag assembly of claim 6, wherein neither of the two lateral sides comprises end caps.

11. The inflatable knee airbag assembly of claim 6, wherein the cover comprises an integral hinge that is located on a car-forward portion of the cover and is parallel with the car-forward longitudinal end cap.

12. The inflatable knee airbag assembly of claim 5, wherein the cover is formed from a unitary piece of extruded plastic.

13. An inflatable knee airbag assembly comprising:
an inflatable knee airbag;
an inflator coupled to the inflatable knee airbag;
a housing coupled to the inflator; and
a cover coupled to the housing, wherein the cover has a car-forward longitudinal side, an opposing car-rearward longitudinal side with a tear seam, two opposing lateral sides, and an external surface that extends between the car-forward and car-rearward longitudinal sides and extends between the lateral sides,
wherein the car-forward longitudinal side and the car-rearward longitudinal side each comprise end caps, and wherein each of the end caps comprises structures for coupling the cover to the housing, and
wherein each of the longitudinal end-caps comprises a tang that extends away from the external surface of the cover and away from the longitudinal end cap inwardly toward the housing such that each of the tangs rests adjacent to and parallel with a longitudinal sidewall of the housing, and wherein each of the tangs is configured to stiffen the cover against rotational forces encountered during inflatable knee airbag deployment.

14. The inflatable knee airbag assembly of claim 13, wherein the structures for coupling the cover to the housing comprise a plurality of windows and the housing comprises a plurality of hooks that are each configured to engage one of the windows on the cover.

15. The inflatable knee airbag assembly of claim 14, wherein the windows in the cover each comprise an extension that is directed toward an outside edge of the cover end cap, and wherein the extensions collectively comprise a tear seam.

16. The inflatable knee airbag assembly of claim 15, wherein upon activation of the inflator, inflation gas begins to fill the inflatable knee airbag, which applies pressure to the cover, and
wherein after a predetermined magnitude of pressure is applied to the cover, each of the extensions of the windows rupture such that the cover may rotate about the hinge and thereby allow the inflatable airbag to exit the housing.

17. The inflatable knee airbag assembly of claim 13, wherein the housing comprises two opposing lateral sidewalls, and wherein each lateral sidewall comprises a flange that extends away from each lateral sidewall, and
wherein the lateral sides of the cover are coupled to the flanges of the housing.

18. The inflatable knee airbag assembly of claim 17, wherein each of the lateral sides of the cover comprises a flange, and wherein the flange of the cover is coupled to the flange of the housing.

19. The inflatable knee airbag assembly of claim 18, wherein the flanges of the cover are restricted to only a car-forward portion of the cover.

20. The inflatable knee airbag assembly of claim 19, wherein the tear seam is located between the flange of the cover and a car-rearward end cap of the cover.

21. The inflatable knee airbag assembly of claim 13, wherein the cover comprises a tear seam located on a car-rearward portion of the cover, and wherein the tear seam is parallel with a car-rearward end cap of the cover.

22. The inflatable knee airbag assembly of claim 21, wherein the tear seam runs along an entire longitudinal length of the cover.

23. The inflatable knee airbag assembly of claim 13, wherein in a deployed configuration, the cover comprises a first piece and a second piece, and wherein the first piece comprises a portion of the cover from the tear seam to a car-forward tang and the second piece comprises a portion of the cover from the tear seam to the car-rearward tang.

* * * * *